(12) United States Patent
Seto et al.

(10) Patent No.: US 7,654,283 B2
(45) Date of Patent: Feb. 2, 2010

(54) CHECK VALVE AND PUMP INCLUDING CHECK VALVE

(75) Inventors: Takeshi Seto, Chofu (JP); Kunihiko Takagi, Okaya (JP); Kazuo Kawasumi, Chino (JP)

(73) Assignee: Seiko Epson Corporation (JP)

( * ) Notice: Subject to any disclaimer, the term of this patent is extended or adjusted under 35 U.S.C. 154(b) by 820 days.

(21) Appl. No.: 10/968,865

(22) Filed: Oct. 19, 2004

(65) Prior Publication Data

US 2005/0175490 A1 Aug. 11, 2005

(30) Foreign Application Priority Data

Oct. 21, 2003 (JP) ............................. 2003-360758
Nov. 11, 2003 (JP) ............................. 2003-381279

(51) Int. Cl.
*F16K 15/14* (2006.01)
*F04B 53/10* (2006.01)

(52) U.S. Cl. ................. 137/515.5; 417/559; 137/454.2; 137/855

(58) Field of Classification Search ................ 417/395, 417/559, 565, 566; 137/454.2, 515.3, 515.5, 137/515.7, 534, 855
See application file for complete search history.

(56) References Cited

U.S. PATENT DOCUMENTS

| 3,307,819 | A | * | 3/1967 | Cocito | 248/363 |
| 4,201,241 | A | * | 5/1980 | Schertler | 137/527 |
| 5,609,476 | A | * | 3/1997 | Kim et al. | 417/447 |
| 5,816,783 | A | * | 10/1998 | Oshima et al. | 417/415 |
| 6,623,256 | B2 | * | 9/2003 | Takagi et al. | 417/413.2 |
| 6,623,258 | B1 | * | 9/2003 | Iversen et al. | 417/559 |
| 2003/0168103 | A1 | * | 9/2003 | Onstenk et al. | 137/512.15 |

FOREIGN PATENT DOCUMENTS

| CN | 1372078 | 10/2002 |
| JP | 61-6077 | 1/1986 |
| JP | 10-132112 | 5/1998 |
| JP | 10-220357 | 8/1998 |
| JP | 11-336538 | 12/1999 |
| JP | 2000-002350 | 1/2000 |
| JP | 2001-153000 | 6/2001 |
| JP | 2001-173816 | 6/2001 |
| JP | 2001-342963 | 12/2001 |
| JP | 2004-162547 | 6/2004 |

OTHER PUBLICATIONS

Interference fit, http://en.wikipedia.org/w/index.php?title=Interference_fit&oldid=281269726 (last visited Apr. 10, 2009).*

* cited by examiner

*Primary Examiner*—Devon C Kramer
*Assistant Examiner*—Leonard J Weinstein
(74) *Attorney, Agent, or Firm*—Harness, Dickey & Pierce, P.L.C.

(57) ABSTRACT

A check valve includes a tubular valve seat frame, a valve seat that is fixedly secured to the inside of the valve seat frame and has a communication hole through which a working fluid flows, and a valve body that is on the working fluid outflow side of the valve seat for opening and closing the valve seat. The valve seat frame, the valve seat, and the valve body are put into one unit so that the check valve has a simple structure and a good assembly property, and can be manufactured at low cost. The check valve is included, whereby a small, durable, and high-performance pump can be provided.

5 Claims, 19 Drawing Sheets

CHECK VALVE AND PUMP INCLUDING CHECK VALVE

FIELD OF THE INVENTION

The present invention relates to a check valve that can be built in a pump as a unit of a valve seat, a valve body, and a valve sheet frame and a pump including the check valve.

DESCRIPTION OF THE BACKGROUND ART

Hitherto, a pump for allowing a working fluid to flow has included a check valve as a resistance element in a fluid flow pass. Particularly, there are check valves adopted for a small motor for changing the volume of a pump chamber by a piston or a diaphragm for allowing a working fluid to flow.

As the first related art, a structure of a check valve made up of a pump suction and discharge unit having a suction port and a discharge port of working fluid, a pump valve seat unit having a suction side check valve and a discharge side check valve, and a pump actuator unit with the pump valve seat unit fixed via an O ring as a sealant between the pump suction and discharge unit and the pump actuator unit and a pump including the check valve is known as a structure for controlling working fluid when the working fluid is sucked into a pump chamber, and discharging the working fluid into the outside of the pump chamber (JP-A-10-220357).

As the second related art, a check valve including a valve seat, a ball on the suction side of a working fluid for opening and closing the valve seat, a stopper with an opening for limiting the movement amount of the ball, and a joint member for assembling the valve seat and the stopper into one piece is known as a check valve in a fluid flow pass for sucking the working fluid into a pump chamber and allowing the working fluid to circulate only in one direction in discharging the working fluid into the outside of the pump chamber. Further, the check valve is pressed against and fixed to a pump case by a press member. A pump including a pair of the check valves on the suction side and the discharge side of the working fluid is also known (JP-A-2000-2350).

Further, as the third related art, a check valve made up of a valve seat formed in a pump housing, a ball for opening and closing the valve seat, a ball stopper for limiting the movement amount of the ball, and a coil spring for pressing the ball against the valve seat and a pump including the check valve are known (JP-A-2001-173816).

However, in the invention described in JP-A-10-220357, when the pump valve seat unit includes the suction side check valve and the discharge side check valve, the size in the plane direction increases. Since the pump valve seat unit is sandwiched between the pump suction and discharge unit, and the pump actuator unit via the O ring and is fixed, the pump performance may become unstable because the pump chamber space area is not constant.

Further, the sealing property of the O ring can degrade with the use of the O ring for a long term. Also, it is inconvenient to replace the O ring at regular time intervals and the inconvenient to consider the chemical resistance depending on the type of working fluid and change the material of the O ring.

The pump valve seat unit is molded of a synthetic resin and the suction side check valve has a structure wherein a separation section of a suction section and a discharge section of fluid floats above the pump chamber. Thus, when the actuator is driven, the pump valve seat unit becomes deformed and a predetermined pressure in the pump chamber cannot be provided. The valve seat also wears as working fluid flows and a flaw can easily occur because of cavitation, etc., which causes insufficient durability.

In the invention described in JP-A-2000-2350, the ball is included in the space provided between the valve seat and the stopper, and moves in the space, to thereby open and close the valve seat. However, the gap between the ball guide wall of the stopper and the ball is small, and movement of the ball is hindered because of contact resistance. Since there is rapid change in the opening width on the seating face of a working fluid outflow section of the valve seat, a vortex may occur which inhibits the smooth flow of the working fluid.

Since the ball is molded of cemented carbide or ceramics, and the weight per unit volume is larger than that of a general working fluid, the ball is hard to move when opening and closing the valve seat. Thus, the check valve is unsuitable for a small pump for making the working fluid flow out at a high frequency using a diaphragm, for example.

Further, in the invention described in JP-A-2001-173816, the check valve has a structure wherein the ball is pressed against the valve seat side by a coil spring at all times and the valve seat is opened with the pressure of the working fluid, and is closed by the elastic force of the coil spring. Thus, the inflow pressure into a fluid inflow path requires a considerable size for the elastic force of the coil spring and the weight of the ball, and it is difficult to adopt the check valve as a small check valve for opening and closing the valve seat based on the inertance value difference between the inlet flow pass and the outlet flow pass of working fluid, for example.

In such a pump, a coil spring is included in the flow pass of the working fluid in the check valve and thus the flow of the working fluid is inhibited by the coil spring. Further, the fluid flow pass is curved rapidly from the check valve and thus the flow resistance of the working fluid increases.

It is therefore an object of the invention to provide a check valve which has a simple structure and a good assembly property that can be provided at low cost. It is also an object of the present invention to provide a small, durable, and high-performance pump including the check valve.

SUMMARY OF THE INVENTION

A check valve of the invention includes a tubular valve seat frame, a valve seat that is fixedly secured to the inside of the valve seat frame and that has a communication hole through which a working fluid flows, and a valve body that is on the working fluid outflow side of the valve seat for opening and closing the valve seat, wherein the valve seat frame, the valve seat, and the valve body are put into one unit.

According to the invention, the check valve is made up of at least the three parts of the valve seat, the valve seat frame, and the valve body and thus has a simple structure with a small number of components. As such, the check valve can be manufactured at low cost. Since the check valve is put into a unit, performance management can be conducted in a single unit. When the check valve is built in a pump, stable performance of the check valve can be provided without adjusting or inspecting the check valve. The check valve can be built in the pump without touching the valve body or the communication hole of the valve seat so that a good assembly property is provided and predetermined performance can be provided without causing damage to or deforming the check valve during assembly.

The need for providing an O ring as a sealing member on the periphery of the check valve as in the related art described above is eliminated. The sealing property of the O ring can be degraded with the use of the O ring for a long term and the inconvenience of the need for replacing the O ring at regular time intervals is involved. However, the structure of the present invention eliminates the inconvenience of the need for replacing the O ring at regular time intervals, and the inconvenience of considering the chemical resistance depending on the type of working fluid and changing the material of the O ring are eliminated.

Further, the invention is characterized in that the valve seat is formed of a material having higher hardness than that of the valve seat frame, and that of the valve body.

For example, hard metal of cemented carbide, etc., or ceramics can be adopted as the material of the valve seat. As the ceramics, polycrystalline sinter material such as $Al_2O_3$ is representative, but single-crystal material can also be adopted.

According to the invention, since materials have high hardness, shock or cavitation caused by opening and closing the valve body can be prevented from causing wear in, or damage to, the valve seat.

Further, wear caused by the flow of the working fluid can be prevented. Consequently, good performance can be maintained over a long term.

The invention is characterized in that the valve body is made up of a fixing part and an opening-closing part, and is provided on the side of the valve seat where the working fluid flows out and the fixing part is fixedly secured to the valve seat frame.

For example, welding, adhesion, brazing, etc., can be adopted as means for fixedly securing the valve body.

In such a structure, the flow resistance of the working fluid is small and a smooth flow can be conducted as compared with the structure wherein the valve body is provided on the side where the working fluid flows into the valve seat. Since the fixing part of the valve body is fixedly secured to the valve seat frame, and the valve body does not move, the communication hole of the valve seat can be opened and closed reliably.

The invention is characterized in that the working fluid outflow side end face of the valve seat and an end face of the valve seat frame are roughly at the same height, and that the fixing part is fixedly secured to the top face of the valve seat frame.

In doing so, the end face positions of the valve seat and the valve seat frame are set roughly the same, so that the opening-closing part and the fixing part of the valve body are formed of a flat plate or plate-like member, and the shape and dimensions of each part are easily managed. Thus, the cost can be reduced and predetermined performance can be ensured.

The valve body is made up of a fixing part on the periphery, an opening-closing part of the communication hole of the valve seat, and a support part for concatenating the opening-closing part and the fixing part. The valve body is placed in a tubular projection provided on the periphery of the valve seat frame, and the fixing part is fixedly secured by deforming the projection.

According to the above structure, the projection of the valve seat frame is deformed. that is it is crimped fully or partially (the member is deformed and fixed), whereby the fixing part of the valve body is fixed to the valve seat frame so that the valve body can be fixed in a small space reliably. The outer peripheral part of the fixing part of the valve body is also fixed, whereby the valve body can be fixed without deforming the opening-closing part or the support part. The valve body is simply placed in the projection of the valve seat frame, whereby the position in the plane direction is regulated so that the opening-closing part can open and close the working fluid communication hole of the valve seat reliably without using any special jig.

The invention is also characterized in that the valve body is placed in a projection provided on the periphery of the valve seat frame and a ring-like fixing member is press-fitted into the projection of the valve seat frame, whereby the valve body is sandwiched between the valve seat frame and the fixing member.

In doing so, the fixing part provided on the periphery is sandwiched between the valve seat frame and the fixing member in the thickness direction and is fixed so that the valve body can be fixed without producing internal stress in the valve body and thus can be fixed without deforming the support part or the opening-closing part.

The invention is also characterized in that a tubular projection is provided on the periphery of a fixing part of the valve body and is placed in a projection of the valve seat frame and a ring-like fixing member is press-fitted into the projection of the valve body, whereby the valve body is sandwiched between the valve seat frame and the fixing member.

According to the structure, the fixing member is press-fitted into the projection provided on the valve body, whereby the projection of the valve body is sandwiched between the projection of the valve seat frame and the fixing member so that the advantages similar to those described above can be provided. In addition, the valve body is provided with the projection on the periphery, whereby even if a thin plate of about 20 µm, for example, is used, the outer peripheral portion is reinforced so that it is hard to bend and is less deformed during handling.

Since the valve body can be manufactured by press working, etc., the step for providing the projection is not required and the cost is not increased either.

The invention is also characterized in that a tubular projection provided on the periphery of a fixing part of the valve body is press-fitted into a radial gap between the valve seat and the valve seat frame, and is sandwiched therebetween.

According to such a structure, the valve seat is inserted into the projection of the valve body and the valve body and the valve seat are press-fitted into the ring of the valve seat frame, whereby the valve body, the valve seat, and the valve seat frame can be one piece without using the fixing member. Since the valve seat frame need not be provided with the projection as described above, the structure can be made still simpler.

The invention is also characterized in that the valve body is placed in a recess part provided on the valve seat frame so that it can move in a thickness direction, and that a ring-like fixing member for the valve body to support the communication hole so as to be able to open and close the communication hole is provided on the recess part periphery of the valve seat frame.

In doing so, the valve body is regulated at the position in the plane direction by the recess part provided in the valve seat frame and the range of motion in the thickness direction is also regulated by the fixing member. Thus, the diameter and the depth of the recess part can be set appropriately for regulating so that the communication hole of the valve body can be opened and closed properly. Here, the fixing member can be fixed to the recess part periphery of the valve seat frame by face joint means of adhesion, welding, etc. It can also be fixed as a new recess part of a larger diameter than the recess part of the valve seat frame is provided so that the ring-like fixing member can be press-fitted into the recess part.

The invention is also characterized in that the valve body is made up of a fixing part on the periphery, an opening-closing part roughly at the center, and a plurality of blade parts for concatenating the opening-closing part and the fixing part.

The valve body of the structure is formed roughly like a propeller having blade parts, for example As the blade part shape, the astern plane is provided in the valve seat direction and the ahead plane is provided in its opposite direction.

As such, a plurality of blade parts are provided. When the working fluid flows out, the working fluid can flow out from the space between the blade parts in a small resistance state along the astern plane of the moderate curved face of the blade part. When the communication hole is closed, the working fluid presses the ahead plane, whereby the communication hole can be closed by the opening-closing part, and the communication hole can be opened and closed following small motion of the diaphragm.

The invention is also characterized in that the valve seat is formed with a plurality of communication holes, and that opening-closing parts of the valve body are provided in a one-to-one correspondence with the communication holes.

The plurality of communication holes can be provided in a circle, in a line, or in parallel.

According to the present invention, the valve seat is formed with a plurality of communication holes for the working fluid, and the opening-closing parts of the valve body for opening and closing the communication holes are provided separately, but the check valve can be formed without increasing the number of components because the fixing part on the outer periphery is formed in one piece. For example, if the amplitude of the diaphragm is about 10 μm in a diaphragm type pump, the operation range of the opening-closing part of the valve body is about 20 μm. Thus, to increase the flow amount of working fluid, a plurality of communication holes can be provided for increasing the flow amount.

Although one opening-closing part can also open and close the plurality of communication holes, it is considered that it is impossible to open and close all the communication holes in a uniform manner because of the slight deformation or dimensional variation of the opening-closing part. As separate opening-closing parts are provided in a one-to-one correspondence with the communication holes, all the communication holes can be opened and closed reliably.

The invention is also characterized in that the working fluid communication hole of the valve seat is opened like an ellipse.

In such a structure, the opening area can be set large and the flow amount of working fluid can be increased.

Preferably, an inlet and an outlet of the communication hole of the valve seat are smoothly rounded to decrease fluid resistance of the working fluid.

Further, the invention is also characterized in that the pass between an inlet and an outlet of the communication hole is formed smoothly as a continuous, roughly circular arc.

In doing so, the communication hole of the valve seat has a small diameter as compared to the outside of the inlet. As such, when the working fluid flows into the communication hole or flows through the inside of the communication hole, the flow resistance is increased.

Therefore, according to the invention, the inlet and the outlet are smoothly rounded, whereby the inflow resistance when working fluid flows into the communication hole can be decreased and the flow resistance caused by a vortex occurring when working fluid flows out can be decreased.

Further, the inside of the communication hole is also formed to have a shape like a roughly circular arc that is smoothly continuous to the inlet and the outlet so that the flow resistance in the communication hole can be decreased.

The invention is also characterized in that the face of the valve seat on the side into which the working fluid flows is formed like a funnel as a slope or a roughly circular arc continuous to the inlet.

If such a shape is adopted, the resistance when the working fluid flows into the communication hole of the valve seat can be decreased.

More preferably, the funnel shape of a roughly circular arc is made such that a midpoint on the cross section of the inner face slightly swells rather than a letter U of the inner face shape.

Preferably, the face of the valve body in contact with the outlet periphery of the communication hole is formed like a dome or a cone.

In the structure, if the valve body comes in contact with the periphery of the communication hole of the valve seat on a plane, the shape of the valve body is simple and the valve body can be easily manufactured. And if the opening-closing part is shaped like a dome or a cone, contact with the valve seat becomes linear contact pressure is increased, and leakage of the working fluid can be prevented.

The check valve of the invention is characterized in that the valve body for opening and closing the valve seat is a ball. The check valve further includes a ball support member for supporting the ball and is formed with a communication hole for the working fluid. The valve seat frame, the valve seat, the ball, and the ball support member are also put into a unit.

Preferably, the ball is a sphere.

According to the invention, the check valve comprises the valve seat, the valve seat frame, the ball, and the ball support member. Thus, the number of components is small, and each component has a simple shape so that the check valve can be manufactured easily, shape management is easy to conduct, and the check valve can be manufactured at low cost. Since the check valve is put into a unit, performance management can be conducted in a single unit as the check valve and, for example, when the check valve is built in a pump, stable performance of the check valve can be provided without adjusting or inspecting the check valve. Further, the check valve can be built in the pump, etc., without touching the ball or the communication hole of the valve seat so that predetermined performance can be provided without causing damage to or deforming the check valve during assembly.

Since the valve seat is opened and closed by the ball, when the valve seat is open, working fluid flows on the surface of the ball and thus the flow resistance is small. For example, as compared to a case where a plate-like valve is used, when the ball leaves the valve seat for opening the communication hole, even if the move distance is the same, the flow cross-sectional area becomes large so that the flow amount can be increased. When the valve seat is hermetically sealed, the valve seat and the ball come in line contact with each other, the contract pressure increases, and the valve seat can be hermetically sealed reliably.

The invention is also characterized in that the ball support member is made up of a support part on the periphery, a communication hole roughly at the center where working fluid flows, a ball support part for supporting the ball, and an arm-like joint part for joining the support part and the ball support part.

In the invention, the ball support part for supporting the ball is configured as described above so that it can be formed easily of a metal plate material by means of pressing, etc., for example. The center of the ball from the communication hole of the ball support member, and further the peripheral part from the opening between the joint parts, are pushed up by the working fluid, and the ball presses the communication hole of the valve seat for hermetically sealing the communication hole. Thus, the ball easily moves by the pressure of the working fluid, and the communication hole of the valve seat can be hermetically sealed reliably.

When the ball leaves the valve seat and the valve seat is opened, the ball is regulated at the position and is supported by the ball support part of the ball support member so that the ball can be supported at the appropriate position with a small space and in a simple shape.

Further, since the ball rotates at the moving time, the contact position of the ball with the valve seat changes each time and thus the contact position with the valve seat changes, so that wear at the same position can also be prevented.

The invention is also characterized in that a claw part for supporting the ball is projected to the ball support part.

In the above structure, the ball is supported by three radially projected claw parts, provided in the ball support part so that the position of the ball can be regulated reliably. The claw parts support the ball in a range smaller than the diameter of the ball and thus do not hinder flow of the working fluid.

Preferably, when the valve seat is opened or closed, the ball and the ball support member move at the same time or separately, whereby the valve seat is opened or closed.

In doing so, the ball and the ball support member, and the ball support member and the valve seat frame, are supported, but not fixed. Therefore, as only the ball moves, the communication hole of the valve seat can be opened and closed; the ball can be pushed up by the ball support member for hermetically sealing the communication hole; and the ball and the ball support member can move together for opening the communication hole. Because of the structure wherein not only the ball, but also the ball support member can move, the ball support member can also receive positive pressure of the pump chamber and press the ball so that the hermetic sealing force of the communication hole can be enhanced.

Preferably, the ball support part of the ball support member is provided with an elastic part for pressing the ball against the valve seat.

As described above, the ball opens and closes the communication hole and since the ball support part is provided with the elastic part, the ball can be pressed against the communication hole by the elastic force for hermetically sealing the communication hole reliably. More preferably, the elastic force of the elastic part is set to a magnitude such that the ball can be opened by the negative pressure of the pump chamber when the communication hole is opened.

If the ball is brought into contact with the communication hole of the valve seat at all times by the elastic part, when the pump is stopped, the working fluid can be prevented from flowing out.

The check valve of the invention is also characterized in that on the periphery of an outer periphery support part of the ball support member, a tubular side guide part is provided along the inner face of a hole made in the valve seat frame.

In the above structure, as compared to a case where the ball support member is formed like a plate, the ball support member is provided with the tubular side guide part, and the side guide part moves along the inner face of the hole of the valve seat frame so that a smooth move is made without being inclined in the cross-sectional direction, and the communication hole can be opened and closed reliably. If such a side guide part is provided, the space of the check valve need not be increased.

The invention is also characterized in that an average value of the density of the ball and a density of the working fluid are roughly the same.

The ball for opening and closing the communication hole moves with a change in the pressure of the working fluid. Since the average value of the density of the ball and the density of the working fluid are made roughly the same, the ball is in a floating state or in a state close to the floating state of the working fluid if driving of the pump is stopped. Thus, if the pump is driven, the ball moves due to a slight pressure change of the working fluid so that if the drive source of the pump is driven at a high frequency, like a piezoelectric element, the ball moves in synchronization with the drive frequency and can open and close the valve seat.

Further, the invention is characterized in that the ball is hollow.

Considering durability, a metal such as an iron-based alloy, a stainless alloy, a copper-based alloy, or an aluminum alloy, or glass, ceramics, a synthetic resin, etc., can be adopted as the material of the ball.

If the ball is formed of any of the above materials, the weight per unit volume of the ball is large and the ball will be hard to move if a slight pressure change of the working fluid is made. If the ball is made hollow, however, the weight per unit volume of the ball can be decreased, and the thickness of the outer shell of the ball can be adjusted according to the material of the ball and the material of the working fluid, whereby the weight per unit volume of the ball can be set to roughly the same as the weight per unit volume of the working fluid pushed away by the ball as described above. As such, the advantages as described above can be provided.

Further, the invention is characterized in that the ball has a surface formed with a coating.

As the coating, a hard anodic oxide coating of cemented carbide, nickel, chromium, ceramics, etc., can be adopted. As means for coating the ball, a wet plating such as an electroplated coating or a chemical plating or a dry plating such as vacuum evaporation, sputtering, or ion plating can be adopted. A rubber-based soft material can also be adopted.

In such a structure, the ball for opening and closing the communication hole is formed on the outer shell with the coating. Thus, even if the material of the ball is limited for ease of manufacturing, if any hard anodic oxide coating described above is selected, the hardness of the surface can be made high and thus the ball is less worn or is less damaged by the shock of opening and closing the communication hole although the ball is used for a long term. If the ball is made hollow as described above, the hard anodic oxide coating can prevent the ball from becoming deformed.

If a soft coating is selected, the sealing property of the valve seat can be more enhanced.

The invention is characterized in that on the outside of the communication hole of the valve seat, an inlet and an outlet for allowing the working fluid to flow are smoothly formed continuously as a roughly circular arc, and that the outlet has an opening formed as a circular arc of a larger diameter than the diameter of the ball.

Thus, the communication hole has an inlet and an outlet made continuous as a smooth circular arc so that the fluid resistance when the working fluid flows through the valve seat can be decreased. Particularly, the outlet is opened and closed by the ball and thus when the outlet is formed on the outside of the opening with a larger circular arc than the diameter of the ball, even when the ball is brought slightly away from the valve seat, the cross-sectional area of the opening where the working fluid flows out can be wide so that the outflow amount of the working fluid can be increased. This also provides the effect of bringing the ball away from the valve seat.

The ball moves to the communication hole along the surface of the circular arc provided on the outside of the opening of the outlet and hermetically seals the communication hole. Thus, if the ball moves and the plane direction position of the ball varyies slightly, the ball can hermetically seal the communication hole more reliably.

Further, the invention is characterized in that the ball support member is fixedly secured to the valve seat frame.

If the ball support member is fixedly secured to the valve seat frame, the ball opens and closes the communication hole solely. But if the ball is regulated at a position in the plane direction by the ball support part of the ball support member, the position of the ball relative to the communication hole of the valve seat can be regulated more precisely.

Because of the above structure, wherein only the ball moves, a check valve of a simple structure can be provided as compared to a structure wherein the ball support member moves.

The invention is also characterized in that on the side of the valve seat frame between the valve seat and the ball support member, a hole that is pierced from the inside to the outside is made.

It should be noted that although the valve seat, the valve seat frame, the ball, and the ball support member are put into a unit as described above, the through hole is made in the side of the valve seat frame so that the position and motion of the ball can be checked through the hole in the single unit of the check valve.

If the check valve is clogged with the working fluid, the check valve can also be removed from the pump for allowing, for example, a cleaning fluid, etc., to flow through the hole for cleaning the inside of the check valve.

A pump of the invention includes a pump chamber whose volume can be changed by a piston or a diaphragm; an inlet flow pass for allowing the working fluid to flow into the pump chamber; and an outlet flow pass for allowing the working fluid to flow out from the pump chamber. The pump further includes an actuator for driving the diaphragm and a cabinet for supporting the actuator. A pump of the present invention is also characterized in that a check valve as described in any of the above embodiments can be included between the inlet flow pass and the pump chamber.

The pump includes the check valve as described above and thus has advantages in that it is small, has a simple structure, can be manufactured at low cost, allows the working fluid to flow smoothly, and is durable. Particularly, the advantages described above are noticeable in a small pump wherein the inertance of the outlet flow passage is larger than that of the inlet flow pass, and the pressure applied to the valve seat is large. The check value of the present invention is particularly effective for a small pump of a diaphragm type, etc., and the pump can be used for a cooling device of an electronic machine such as a projector, a water jet knife, a fluid actuator, a power source of a piston of a microhydraulic press, etc. It should be noted, however, that the present invention is not limited to the above uses.

DETAILED DESCRIPTION OF THE PREFERRED EMBODIMENTS OF THE INVENTION

Check valves and pumps including the check valves according to the invention will be discussed. Embodiments described below are only exemplary and the invention is not limited to the specific embodiments.

To begin with, a first embodiment of the invention will be discussed. FIGS. 1 to 10 show a check valve of the first embodiment and a pump 10 including the check valve.

Figure 1:
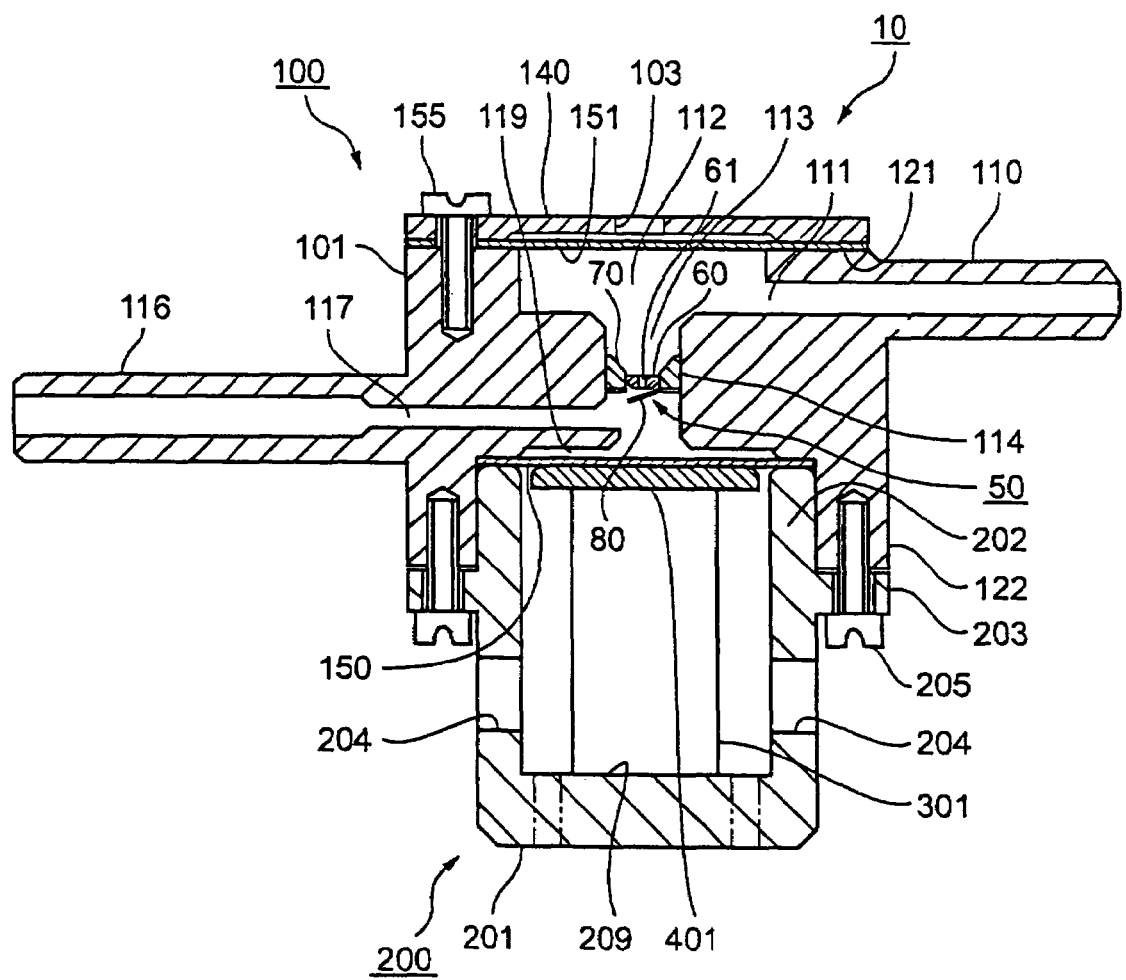
FIG. 1 is a sectional view showing a pump according to a first embodiment of the invention.

FIG. 1 is a longitudinal sectional view of the pump in which the check valve of the first embodiment is placed. In FIG. 1, the pump 10 includes a pump chamber unit 100 and an actuator unit 200.

The pump chamber unit 100 is made up of a pump chamber body 101 including an inlet flow pass 111 into which a working fluid is made to flow in and an outlet flow pass 117 from which the working fluid is made flow out, a diaphragm 150, and an elastic film 151 that may be used as pulsating flow absorption means for preventing a pulsating flow of the working fluid.

The pump chamber body 101 has an outside shape roughly like a cylinder in plan view. An inlet connection pipe 110 formed with the inlet flow pass 111 projects from one side of the pump chamber body 101, and the inlet flow pass 111 communicates with an elastic wall chamber 112. The tip of the inlet flow pass 111 is connected to external piping of a tube, etc., (not shown) for supplying the working fluid. On the opposite side to the inlet connection pipe 110, an outlet connection pipe 116 formed with the outlet flow pass 117 projects. The outlet flow pass 117 has an inner end part communicating with a pump chamber 119 and an opposite end as a discharge port for the working fluid that is connected to an external piping (not shown).

The elastic wall chamber 112 with which the inlet flow pass 111 communicates is formed as a cylindrical recess roughly at the center of the pump chamber body 101. An elastic film 151 is hermetically fixed to an opening periphery upper face 121 in an upper portion in the figure, and an opening 113 on the pump chamber 119 side has a diameter that is set to be smaller than the inner diameter of the elastic wall chamber 112. A check valve 50 is placed between the opening 113 and the pump chamber 119. The check valve 50, as a fluid resistance element, may be opened to allow the working fluid to flow from the inlet flow pass 111 to the outlet flow pass 117, or may be closed.

In a pump that is driven at a higher frequency than a smaller pump that is driven at about 5 kHz, the elastic film 151 and the elastic wall chamber 112 are preferably provided, but are not necessarily required.

A thin recess is formed on the opposite side to the elastic wall chamber 112 with the check valve 50 between. The space hermetically sealed by the diaphragm 150 is the pump chamber 119.

The pump chamber body 101 is preferably formed by metal injection molding. It can also be molded using precision casting, etc. Preferably, stainless steel, a titanium alloy, etc., is adopted as a material because of its chemical resistance, rust prevention, and structural strength, but an iron-based alloy or a copper-based alloy can also be adopted.

Figure 2:
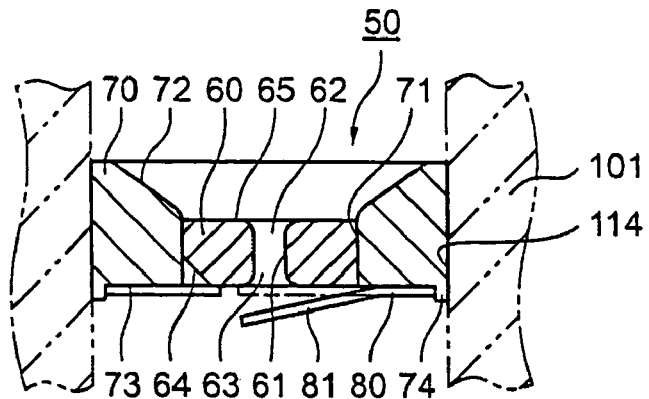
FIG. 2 is a sectional view showing a check valve according to the first embodiment of the invention.

The check valve 50 is a unit made up of a valve seat 60, a valve seat frame 70, and a valve body 80 as can be seen with reference to FIG. 2. The check valve 50 is pressed into an inner wall 114 of the opening 113 and is closely fixed.

The diaphragm 150 is a disk-like, thin plate made of stainless steel, etc., that has a thickness of about 20 μm, and has an outer peripheral portion closely fixed to the periphery of the pump chamber 119 by means of adhesion, welding, brazing, etc.

An upper plate 140 that is an elastic film protection member is placed on the top face of the elastic film 151 and has an outer peripheral portion screwed into and fixed to the pump chamber body 101 together with the elastic film 151 with a fixing screw 155. Only one fixing screw 155 is shown in FIG. 1, but three or four fixing screws 155 are included in the plane direction in balance. When the working fluid pulsates, the elastic film 151 bends in the cross-sectional direction to absorb the pulsation, but a recess, in the range out of contact if the elastic film 151 bends, is formed on the face side of the upper plate 140 that comes into contact with the elastic film 151. A hole 103 for releasing air that is hermetically sealed by the upper plate 140 and the elastic film 151 is made at the center in the plane direction.

The pump chamber body 101 is formed with a tubular part 122 projected to the outer periphery on the opposite side to the elastic wall chamber 112 with the check valve 50 between. The tubular part 122 has an end face that is provided with a female screw for fixing the actuator unit 200. The diaphragm 150 for hermetically sealing the actuator unit 200 side of the pump chamber 119 is closely fixed to the opening of the pump chamber 119 inside the tubular part 122. The corner of the wall of the pump chamber 119 that comes into contact with the diaphragm 150 is smoothly rounded.

A cabinet 201 of the actuator unit 200 is inserted into the inside of the tubular part 122.

The cabinet 201 is shaped like a tube with one side closed and an opposite side opened, and is formed with a tubular part 202 and a flange part 203 projecting in the outer direction from the outer periphery of the tubular part. The tubular part 202 is pressed into the inside of the tubular part 122 of the pump chamber body 101 and is detachable.

The tubular part 202 has an end part pressing the diaphragm 150, but has an inner diameter that is sized so as not to come in contact with an upper bed 401. The corner of the tubular part 202 that comes into contact with the diaphragm 150 is preferably smooth. The inner diameter coming in contact with the diaphragm 150 is roughly the same as the inner diameter of the part of the pump chamber body 101 coming in contact with the diaphragm 150.

The cabinet 201 (actuator unit 200) and the pump chamber unit 100 are fixed by fixing screws 205 between the insertion hole of each fixing screw 205 provided in the flange part 203 and the female screw provided in the tubular part 122 of the pump chamber body, and are put into one piece with sufficient strength for allowing the pump 10 to be used.

An actuator 301 is provided inside the tubular part 202 of the cabinet 201.

The actuator 301 is a piezoelectric element for conducting stretching vibrations in the length direction, and has one end face to which the upper bed 401 is fixedly secured and an opposite end part fixedly secured to a bottom 209 of the cabinet 201.

The upper bed 401 is a disk formed of a material of a small specific gravity such as an aluminum alloy, and the opposite face to the adhesion face of the actuator 301 is brought into intimate contact with the diaphragm 150. When a bias voltage is applied to the actuator 301 from an external control circuit (not shown), the actuator 301 conducts stretching vibrations; when the actuator 301 stretches, it presses and bends the diaphragm 150 for decreasing the volume of the pump chamber 119. When the actuator 301 contracts, it restores the diaphragm 150 to the former state for increasing the volume of the pump chamber 119.

The upper bed 401 can be omitted if the end area and shape of the actuator is set appropriately.

In a side of the tubular part 202 of the cabinet 201, a through hole 204 is made from the inside to the outside. A lead wire for applying a bias voltage to the actuator 301 is preferably inserted into the through hole 204, although not shown.

Here, the relation of inertance of the flow pass in the pump of the invention will be discussed. If a pressure fluctuation absorption element such as a soft part exists in the flow pass, the flow pass to the pressure fluctuation absorption element may be used to calculate the inertance. Thus, the inertance of the inlet flow pass is the inertance of the flow pass from the elastic film 151 of the pressure fluctuation absorption element to the check valve 50. On the other hand, the inertance of the outlet flow pass is the inertance of the outlet flow pass 117. In a comparison between the two types of inertance, the inertance of the outlet flow pass is by far larger than that of the inlet flow pass.

Next, the check valve 50 according to the first embodiment of the invention will be discussed.

FIG. 2 shows the cross-sectional shape of the check valve 50 of the first embodiment. In FIG. 2, the check valve 50 is formed of the valve seat 60, the valve seat frame 70, and the valve body 80. The valve seat 60 is a disk-like member having a communication hole 61 for the working fluid made at the center. An inlet 62 and an outlet 63 for the working fluid of the communication hole 61 are rounded smoothly. The inlet side is rounded to decrease the inflow resistance of the working fluid and the outlet side is rounded to decrease a vortex occurring when working fluid flows out.

A slope 64 is provided at the outer peripheral corner on the outflow side of the valve seat 60 for setting the contact area with the valve body 80 to a proper size, and for facilitating the press fitting into the valve seat frame 70.

The valve seat 60 is formed of a material having higher hardness than that of the valve seat frame 70 and the valve body 80. Preferaby, a cemented carbide or a ceramic ($Al_2O_3$, etc.,) is adopted as the material of the valve seat 60.

The valve seat frame 70 is formed like a ring having a through hole 71 made at the center into which the valve seat 60 may be press-fitted. The working fluid inflow side of the through hole 71 is formed to have a shape that is smoothly rounded from roughly the same position as the height of a top face 65 in the figure of the valve seat 60, and is continuous to a slope 72 that is wider than the through hole 71 in the upper part. A tubular projection 74 is formed in the outer peripheral portion of the face on the opposite side to the slope 72. The valve body 80 is placed in the projection 74 and is fixedly secured to a bottom 73 of the projection 74 by means of welding, adhesion, etc. The material of the valve seat frame 70 is not limited, but a copper-based alloy is preferably used.

The end face leading to the outlet 63 of the valve seat 60 and the bottom 73 of the valve seat frame 70 are the same height, and the valve body 80 is joined to the valve seat 60 and the bottom 73 at the same height.

The valve seat 60, the valve seat frame 70, and the valve body 80 are put into a unit as described above and are press-fitted into the inner wall 114 of the opening of the pump chamber body 101.

When an opening-closing part 81 presses the valve seat 60 (indicated by the chain double-dashed line in the figure), the valve body 80 hermetically seals the communication hole 61; when the opening-closing part 81 is brought away from the valve seat 60 (indicated by the solid line in the figure), the valve body 80 opens the communication hole 61.

Figure 3:
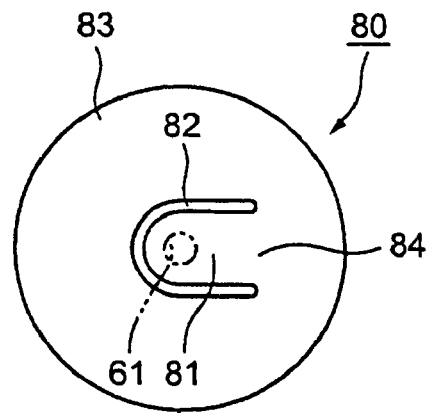
FIG. 3 is a plan view showing a valve body according to the first embodiment of the invention.

FIG. 3 is a plan view of the valve body 80 of the first embodiment. In FIG. 3, the valve body 80 is a thin disk formed with a slit 82 that is shaped roughly like a letter U at the center, and includes a support part 84 for concatenating the opening-closing part 81 and a peripheral fixing part 83.

The support part 84 and the opening-closing part 81 are formed thinner than the fixing part 83 (although not shown) for enhancing the fixing strength of the fixing part 83, and enabling easy opening and closing of the support part 84 and the opening-closing part 81 following stretch and contraction of the diaphragm 150.

Stainless steel, etc., is preferably adopted as the material of the valve body 80.

Various shapes can be adopted for the valve body 80 in addition to that shown in FIG. 3, and modifications of the valve body 80 will be discussed with reference to FIGS. 4 to 6.

Figure 4:
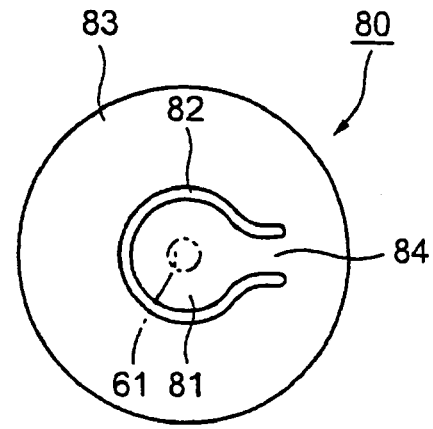
FIG. 4 is a plan view showing another valve body according to the first embodiment of the invention.

FIG. 4 is a plan view showing one of the modifications of the valve body 80 of the first embodiment. In FIG. 4, a valve body 80 is formed with a slit 82 that is shaped roughly like a horseshoe at the center, and includes a support part 84 for concatenating an opening-closing part 81 and a peripheral fixing part 83. The support part 84 is constricted narrower than the opening-closing part 81. As the width is thinned, the elastic force is adjusted and opening and closing of the opening-closing part 81 are facilitated.

Figure 5:
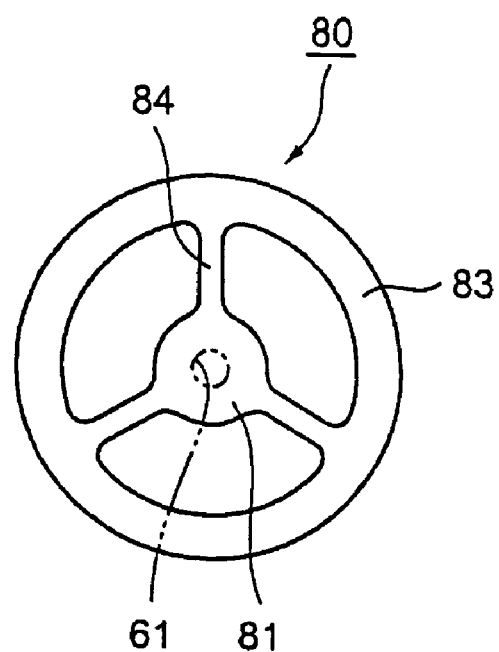
FIG. 5 is a plan view showing another valve body according to the first embodiment of the invention.

FIG. 5 is a plan view showing another modification of the valve body 80 of the first embodiment. In FIG. 5, a valve body 80 is formed with an opening-closing part 81 at the center and an outer peripheral ring-like fixing part 83. The opening-closing part 81 is concatenated by three support parts 84 that extend radially. The support parts 84 bend in the thickness direction following the above-described diaphragm 150, thereby opening and closing the communication hole 1.

A further modification of the valve body 80 described with reference to FIG. 5 will be discussed with reference to FIG. 6.

Figure 6:
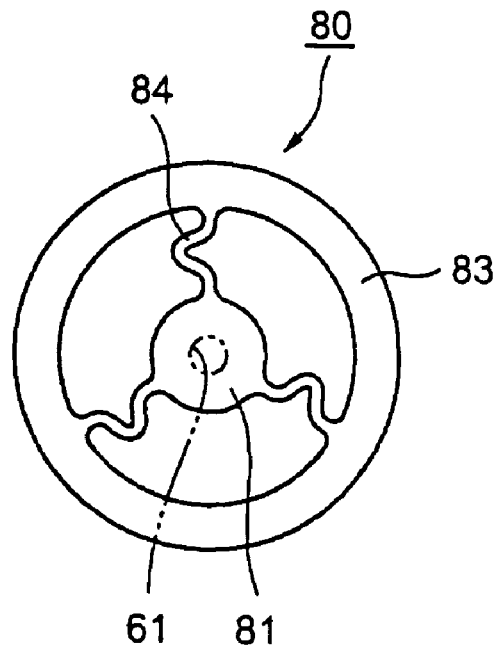
FIG. 6 is a plan view showing another valve body according to the first embodiment of the invention.

FIG. 6 is a plan view showing a modification of the valve body 80. The embodiment shown in FIG. 6 differs from the valve body 80 described with FIG. 5 only in that a curve is contained at a midpoint of each support part 84 that concatenates an opening-closing part 81 and a fixing part 83. Each support part 84 contains the curve part so that the move distance in the thickness direction of the opening-closing part—81 is large, and the elastic coefficient of each support part 84 is small for easy bending.

Next, modification of the valve seat 60 shown in the first embodiment (see FIG. 2) will be discussed with reference to FIGS. 7 and 8.

Figure 7:
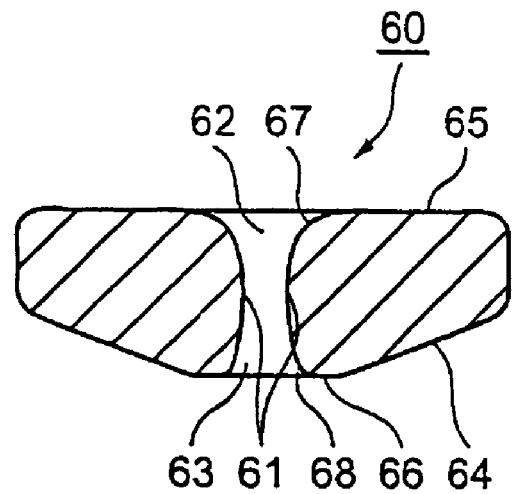
FIG. 7 is a sectional view showing a valve seat according to the first embodiment of the invention.
Figure 8:
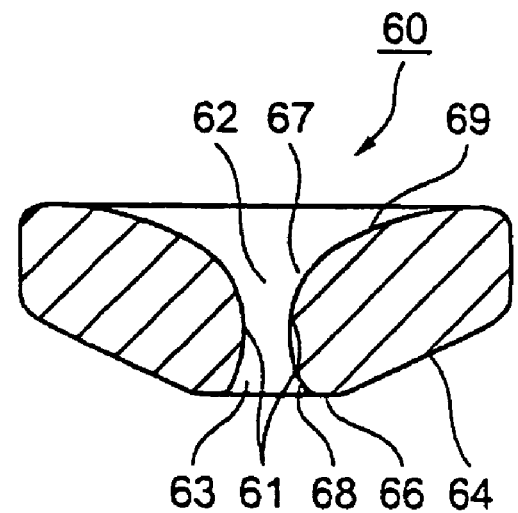
FIG. 8 is a sectional view showing another valve seat according to the first embodiment of the invention.

FIGS. 7 and 8 are sectional views showing the shape of the valve seat 60. In FIG. 7, the valve seat 60 is a disk-like member having a communication hole 61 for the working fluid made at the center, and an inlet 62 and an outlet 63 for the working fluid of the communication hole 61 are smoothly rounded (indicated by numerals 67 and 68 in the figure). The inlet side is rounded to decrease the inflow resistance of the working fluid, and the outlet side is rounded to decrease a vortex occurring when the working fluid flows out.

The communication hole 61 concatenating the round parts 67 and 68 of the inlet 62 and the outlet 63 is formed with a shape including smooth circular arcs so that the center in the cross-sectional direction becomes narrow for decreasing the fluid resistance when the working fluid rapidly flows into the narrow communication hole 61 from the opening 113 of the pump chamber body 101 (see FIG. 1).

In the peripheral portion of the outlet 63, a slope 64 is formed from a flat portion 66 to the outer peripheral portion. The area of the flat portion 66 is set to a size such that the opening-closing part 81 of the valve body 80 is brought into contact with the flat portion 66, and such that the working fluid easily flows out at the opening time. If the heights surrounding the outlet are uniform, no flat portion 66 may be provided.

FIG. 8 is a sectional view of a valve seat showing a modification of the valve seat 60 described with reference to FIG. 7. In FIG. 8, a valve seat 60 has a top face 65 (see FIG. 7) which is not a plane, and is formed with an introduction part 69 of the working fluid concatenated as continuous circular arcs from an inlet 62 to the outer periphery. The introduction part 69 is shaped like a funnel for introducing the working fluid from the opening 113 of the pump chamber body 101 into a communication hole 61 with the fluid resistance lessened.

The introduction part 69 may be formed as a linear slope. Any of the shapes can be selected appropriately from the relationship between the diameter of the opening 113 and the communication hole 61.

Subsequently, the drive operation of the pump 10 of the invention will be discussed.

Figure 9:
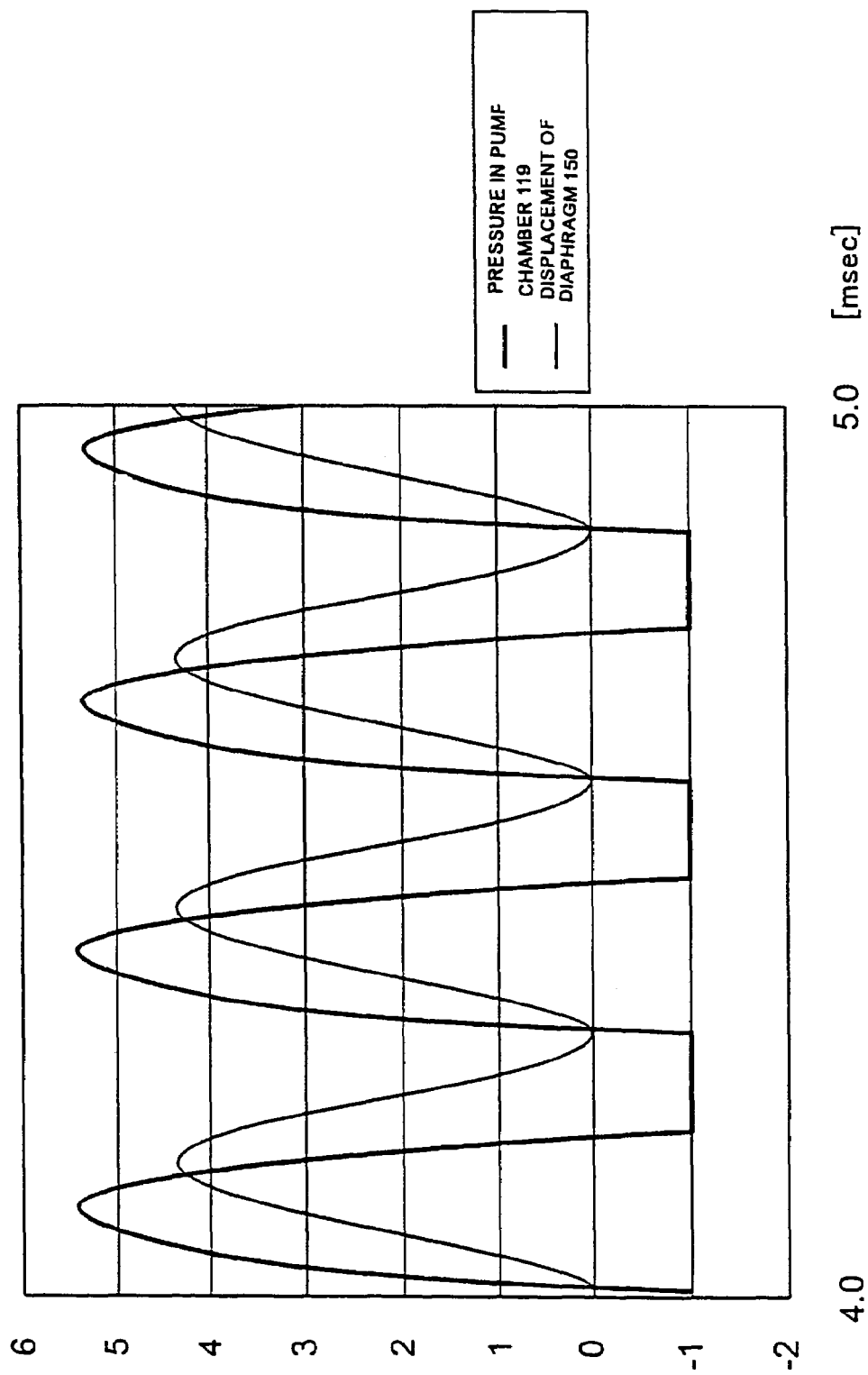
FIG. 9 is a graph showing the relationship between pressure in a pump chamber and displacement of a diaphragm according to the first embodiment of the invention.

FIG. 9 is a graph showing the relationship between pressure in the pump chamber 119 and displacement of the diaphragm 150. A description is given also with reference to FIG. 1. First, a bias voltage is supplied to the actuator 301, whereby the diaphragm 150 vibrates and the volume of the pump chamber 119 changes continuously. Waveforms of pressure (atmospheric pressure) in the pump chamber 119 are indicated as gage pressure and displacement of the diaphragm 150 (μm) in a state in which the discharge flow amount of the working fluid is large as the pump is operated with the load pressure of the pump 10 set to 1.5 atmospheres are shown. In the displacement waveform of the diaphragm 150, the area in which the inclination of the waveform is positive is the process in which the actuator 301 stretches for decreasing the volume of the pump chamber 119. On the other hand, the area in which the inclination of the waveform is negative is a process in which the actuator 301 contracts for increasing the volume of the pump chamber 119.

When the volume decreasing process of the pump chamber 119 starts, the pressure in the pump chamber 119 starts to rise. Before the volume decreasing process terminates, the pressure attains the maximum value and starts to decrease for reasons described later. Further, when the volume decreasing process of the pump chamber 119 starts, the pressure continues to decrease and a vacuum state occurs in the pump chamber 119 and the pressure becomes a constant value of −1 atmosphere, as gage pressure.

Figure 10:
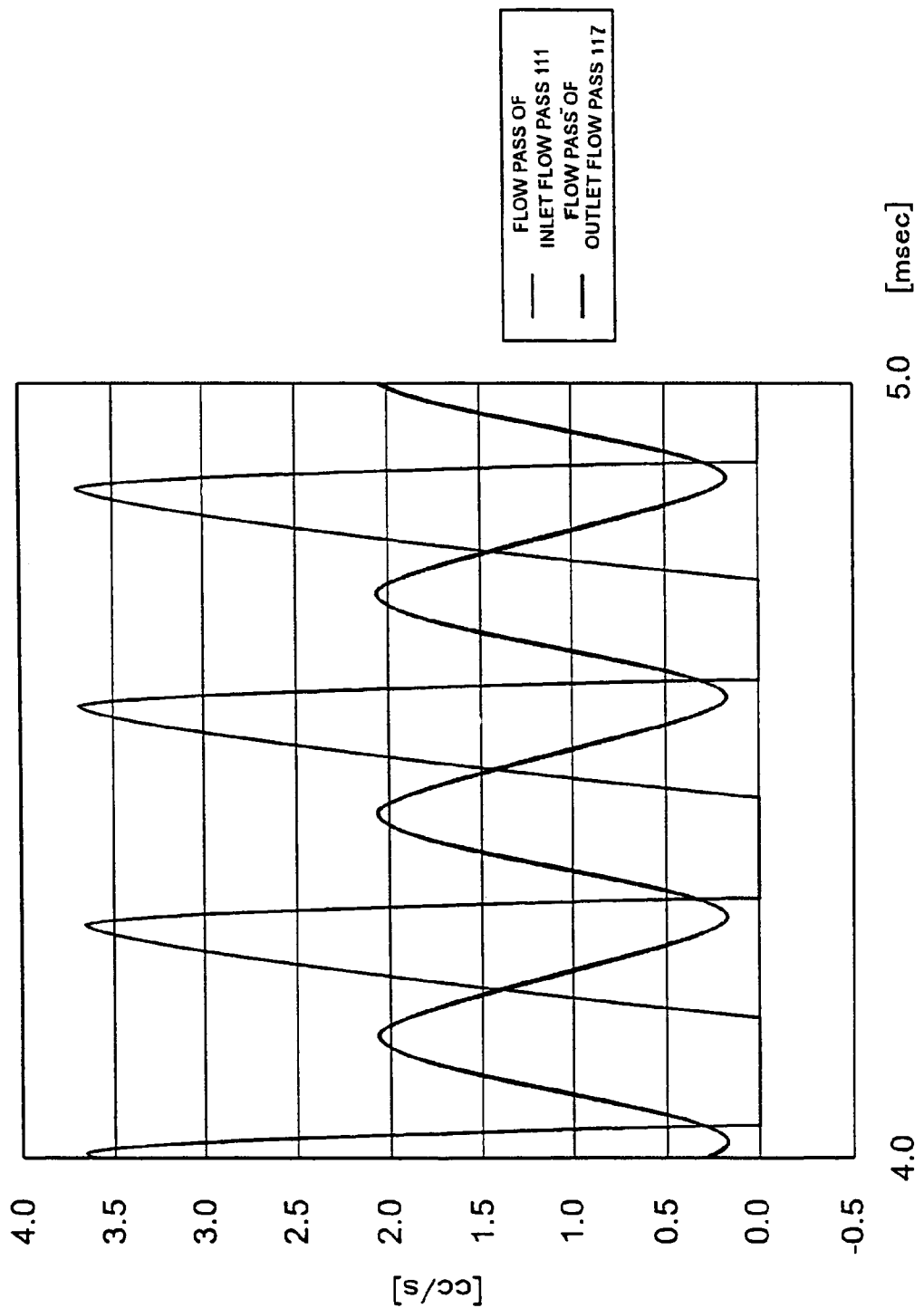
FIG. 10 is a graph showing the relationship between the waveforms of the flow amounts in an inlet flow pass and an outlet flow pass according to the first embodiment of the invention.

FIG. 10 is a graph of the relationship between the waveforms of the flow amounts in the inlet flow pass 111 and the outlet flow pass 117. The flow amount in the forward direction (load direction) when the pump 10 is operated is in the positive direction on the graph.

When the pressure in the pump chamber 119 starts to rise and exceeds the load pressure, the flow amount in the outlet flow pass 117 starts to increase. The working fluid in the pump chamber 119 starts to flow out from the outlet flow pass 117 and the pressure in the pump chamber 119 starts to decrease at the point at which the outflow amount exceeds the volume decrease amount of the pump chamber 119 caused by displacement of the diaphragm 150. When the pressure in the pump chamber 119 decreases and falls below the load pressure, the flow amount in the outlet flow pass 117 starts to decrease. The flow amount change rate is almost equal to the value resulting from dividing the pressure difference between the pressure in the pump chamber 119 and the load pressure by the inertance value of the outlet flow pass 117.

On the other hand, in the inlet flow pass 111, when the pressure in the pump chamber 119 decreases lower than the atmospheric pressure, the pressure difference causes the check valve 50 to be opened, which increases the flow amount. When the pressure in the pump chamber 119 increases higher than the atmospheric pressure, the flow amount starts to decrease. The flow amount change rate is almost equal to the value resulting from dividing the pressure difference between the pressure in the pump chamber 119 and the pressure before the inlet flow pass by the inertance value of the inlet flow pass 111, in a similar manner to that described above, for the time period over which the check valve 50 is opened. Backward flow is prevented by the backflow prevention function of the check valve 50.

In the first embodiment, the check valve 50 is made up of the valve seat 60, the valve seat frame 70, and the valve body 80. Thus, the check valve 50 has a simple structure with a small number of components so that the check valve 50 can be manufactured at low cost. Since the check valve 50 is put into a unit, performance management can be conducted in a single unit. When the check valve 50 is built in the pump 10, stable performance can be provided without again adjusting or inspecting the check valve 50. The check valve 50 can be built in the pump 10 without touching the valve body 80 or the communication hole 61 of the valve seat 60 so that predetermined performance can be provided without causing damage to or deforming the check valve 50 at the assembling time.

An O ring, etc., as a sealing member need not be provided on the periphery of the check valve 50. As such, the inconvenience of replacing the O ring at regular time intervals as the sealing property of the O ring degrades after use of the O ring for a long term, and the inconvenience of considering the chemical resistance depending on the type of the working fluid and the material of the O ring are eliminated.

In the first embodiment, the valve body 80 is placed on the side of the valve seat 60 where the working fluid flows out, and is fixedly secured to the valve seat frame 70. In this manner, the valve body 80 causes less flow resistance of the working fluid and a smooth flow can be conducted as compared with a structure wherein the valve body 80 is placed on the side where the working fluid flows into the valve seat 60.

The fixing part 83 of the valve body 80 fixed to the valve seat frame 70 has an area where the structural strength is larger than that in any other portion. The support part 84 is formed to have a shape that has elasticity which enables vibration, and the opening-closing part 81 is formed to have a shape and thickness that easily comes into contact with the valve seat 60. Accordingly, the valve body 80 is formed in one piece while having different functions so that the valve body 80 can be easily manufactured, and the shapes and dimensions of the parts can be easily managed. Thus, the cost can be reduced and predetermined performance can be ensured.

Since the communication hole 61 of the valve seat 60 has a small diameter as compared to the opening 113 of the pump chamber body 101, when the working fluid flows into or through the communication hole 61, the flow resistance increases. Therefore, as the inlet 62 and the outlet 63 are rounded smoothly, the inflow resistance when the working fluid flows in can be decreased, and the flow resistance caused by a vortex occurring when the working fluid flows out can be decreased.

Further, the inside of the communication hole 61 is also formed like a smoothly continuous circular arc to the inlet 62 and the outlet 63, whereby the flow resistance in the communication hole 61 can be decreased.

Further, in the first embodiment, the working fluid introduction part 69 of the valve seat 60 is formed like a funnel having a slope or a roughly circular arc that is continuous to the inlet 62 so that any resistance that occurs when the working fluid flows into the communication hole 61 of the valve seat 60 can be decreased.

In the first embodiment, the valve seat 60 is formed of a material having a higher hardness as compared to that of the valve seat frame 70 and the valve body 80. For example, the valve seat 60 may be formed of materials such as a hard metal of cemented carbide, or a ceramic so that shock or cavitation caused by opening and closing the valve body 80 can be prevented from causing wear in, or damage to, the valve seat 60. Further, wear caused by the flow of the working fluid can be prevented. Consequently, good performance can be maintained over a long term.

Since the pump of the invention is vibrated at a high frequency by the actuator 301 and the check valve 50 is small, the pressure per unit area becomes high. As such, a pump including the check valve 50 described above is excellent in durability, is small, and has a simple structure that can be provided at low cost.

In the description of the first embodiment, as the means for changing the volume of the pump chamber 119, a diaphragm 150 is taken as an example. However, the check valve of the invention can also be used in a pump that includes a piston rather than a diaphragm, and still provide similar advantages.

Figure 11:
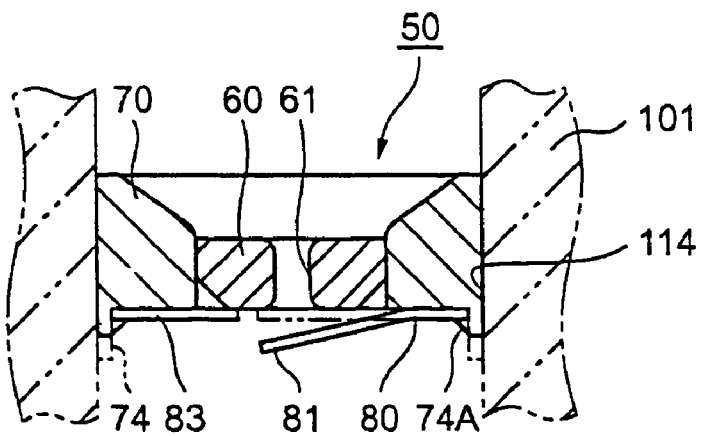
FIG. 11 is a sectional view showing a check valve according to a second embodiment of the invention.

FIG. 11 is a sectional view showing a check valve 50 of the second embodiment of the invention. In the second embodiment, the fixed structure of the valve body 80 to the valve seat frame 70 described in the first embodiment (see FIG. 2) is changed, and only this difference will be discussed. Functional members identical with those of the first embodiment are denoted by the same reference numerals in FIG. 11.

In FIG. 11, a valve seat 60 is press-fitted into a valve seat frame 70. A tubular projection 74 is formed in the outer peripheral portion on the side of the valve seat frame 70 where working fluid flows out, and the height of the projection 74 is set higher than the thickness of a valve body 80. The projection 74 is crimped, with a fixing part 83 of the valve body 80 between (in the figure, the shape indicated by the chain double-dashed line is deformed to the shape indicated by numeral 74A), to a state in which the valve body 80 is placed inside the projection 74, whereby the valve body 80 is fixed. The projection 74 may be crimped fully or partially.

Thus, the check valve 50 is put into a unit and is press-fitted into an inner wall 114 of an opening of a pump chamber body 101.

Therefore, in the second embodiment, the projection 74 of the valve seat frame 70 is crimped fully or partially, whereby the fixing part 83 of the valve body 80 is fixed to the valve seat frame 70. As such, the valve body 80 can be fixed in a small space reliably. The outer peripheral part of the fixing part 83 of the valve body 80 is fixed, whereby the valve body 80 can be fixed without deforming an opening-closing part 81 or a support part 84 (see FIG. 3) of the valve body 80.

Figure 12:
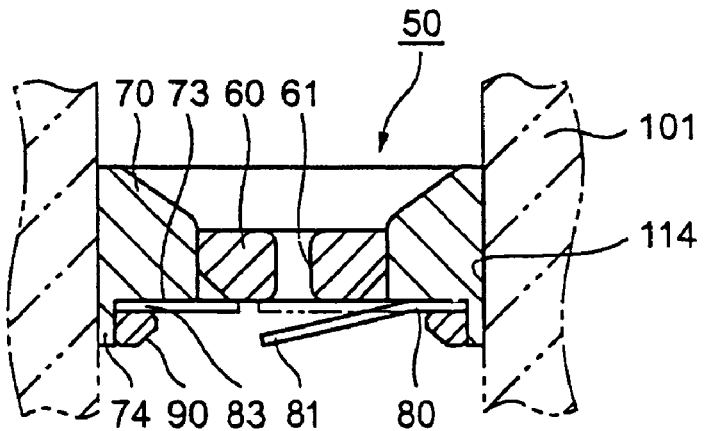
FIG. 12 is a sectional view showing a check valve according to a third embodiment of the invention.

The valve body 80 is simply placed in the projection 74 of the valve seat frame 70, whereby the position in the plane direction is regulated, so that the opening-closing part 81 can hermetically seal a communication hole 61 for the working fluid of the valve seat 60 reliably without using any special jig. FIG. 12 is a sectional view showing a check valve 50 of the third embodiment of the invention. In the third embodiment, the fixing structures of the valve bodies 80 to the valve seat frames 70 are changed, and only this difference will be discussed. Functional members identical with those of the first or second embodiments are denoted by the same reference numerals in FIG. 12. In the figure, a valve seat 60 is press-fitted into a valve seat frame 70. A tubular projection 74 is formed in the outer peripheral portion on the side of the valve seat frame 70 where the working fluid flows out. With a valve body 80 placed inside the projection 74, a ring-like fixing member 90 is press-fitted into the inside of the projection 74, and a fixing part 83 of the valve body 80 is pressed and fixed between a bottom 73 of the valve seat frame 70 and the fixing member 90.

The inner diameter of the fixing member 90 is set to a size in a range that does not hinder the driving of an opening-closing part 81 of the valve body 80. The side of a pump chamber 119 (see FIG. 1) is chambered.

Thus, the check valve 50 is put into a unit and is press-fitted into an inner wall 114 of an opening of the pump chamber body 101 and is fixed.

Therefore, in the third embodiment, the valve body 80 is fixed as the fixing part 83 provided on the periphery is sandwiched between the valve seat frame 70 and the fixing member 90 so that the valve body 80 can be fixed without producing an internal stress. Thus, the valve body 80 can be fixed without deforming the support part 84 or the opening-closing part 81.

Figure 13:
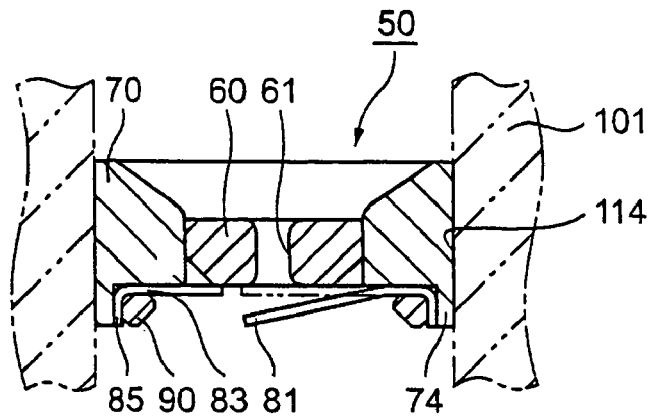
FIG. 13 is a sectional view showing a check valve according to a fourth embodiment of the invention.
Figure 14:
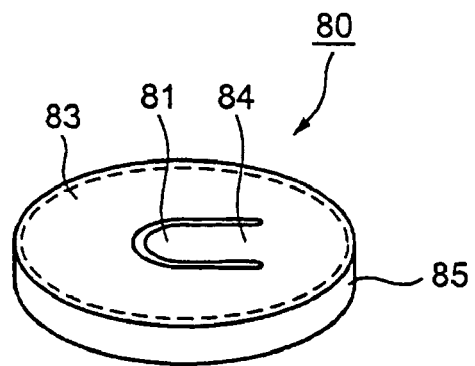
FIG. 14 is a perspective view showing a valve body according to the fourth embodiment of the invention.

FIGS. 13 and 14 show a check valve 50 and a valve body 80, respectively, according to the fourth embodiment of the invention.

FIG. 13 is a sectional view showing a check valve 50 of the fourth embodiment, and FIG. 14 is a schematic perspective view showing the valve body 80 of the fourth embodiment. The fourth embodiment differs from the second or third embodiment only in the fixing structure of the valve bodies 80 to a valve seat frames 70 and, therefore, only this difference will be discussed (see also FIGS. 11 and 12).

In FIG. 13, a valve seat 60 is press-fitted into the valve seat frame 70. A tubular projection 74 is formed in the outer peripheral portion on the side of the valve seat frame 70 where working fluid flows out, a tubular projection 85 is formed on the outer periphery of a fixing part 83 of the valve bodies 80 (see FIG. 14), and a ring-like fixing member 90 is press-fitted into the inside of the projection 85, whereby the projection 85 of the valve body 80 is pressed and fixed between the projection 74 of the valve seat frame 70 and the fixing member 90.

The inner diameter of the fixing member 90 is set to a size in a range that does not hinder the driving of an opening-closing part 81 of the valve body 80, and the side of a pump chamber 119 (see FIG. 1) is chambered.

The projection 85 of the valve body 80, the projection 74 of the valve seat frame 70, and the fixing member 90 are set so as to become almost the same height in a state in which they are assembled.

Thus, the check valve 50 is put into a unit and is press-fitted into an inner wall 114 of an opening of the pump chamber body 101 and is fixed.

In FIG. 14, the valve body 80 will be discussed in detail. The valve body 80 is formed like a vessel provided with the tubular projection 85 in the outer peripheral portion, and is provided with the opening-closing part 81 shaped roughly like a letter U as described in the first embodiment (see FIG. 3).

Figure 15:
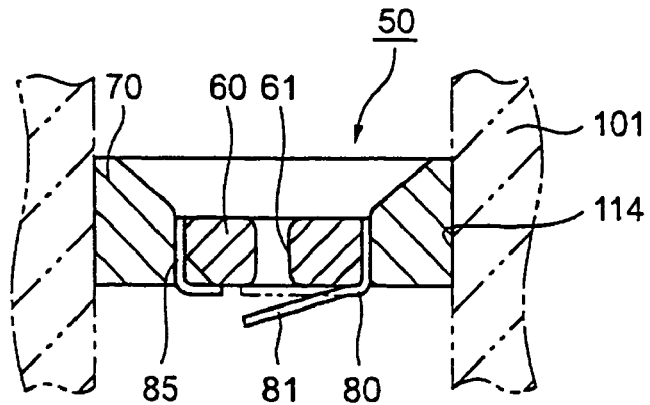
FIG. 15 is a sectional view showing a check valve according to a fifth embodiment of the invention.

The modified shape described in the first embodiment (see FIG. 5, FIG. 6) can also be adopted as the shape of the opening-closing part 81, a support part 84 of the valve body 80. FIG. 15 is a sectional view showing a check valve 50 of the fifth embodiment of the invention. The fifth embodiment differs from the fourth embodiment (see FIG. 13) only in the fixing structure of the valve body 80 and, therefore, only this difference will be discussed. Functional members identical with those of the fourth embodiment are denoted by the same reference numerals in FIG. 15.

In FIG. 15, the difference between the diameter of the outer periphery of a valve seat 60 and the inner diameter of a valve seat frame 70 is set a little smaller than the thickness of the valve body 80. The valve body 80 is provided with a projection 85 in an outer peripheral portion like the valve body 80 described in the fourth embodiment (see FIGS. 13 and 14), but the projection 85 has an outer diameter set a little larger than the inner diameter of the valve seat frame 70, and has a height almost the same as the thickness of the valve seat 60.

The check valve 50 is put into a unit as the valve seat 60 is first inserted into the projection 85 of the valve body 80, and then is press-fitted into the valve seat frame 70. Alternatively, the valve body 80 can also be inserted into the valve seat frame 70 before the valve seat 60 is press-fitted.

Thus, the check valve 50 is put into a unit and is press-fitted into an inner wall 114 of an opening of a pump chamber body 101 and is fixed.

Therefore, in each of the fourth and fifth embodiments, the valve body 80 is provided with the projection 85 on the periphery, whereby even if a thin plate of about 20 μm, for example, is used, it is reinforced as the projection 85 is provided in the outer peripheral portion. As such, the valve body 80 is hard to bend and is less deformed during handling.

Since the valve bodies can be manufactured by press working, etc., the working step for providing the projection is not required and the cost is not increased either.

In the fifth embodiment, the valve body 80 can be fixed between the valve seat frame 70 and the valve seat 60 and, thus, no fixing member is required and the valve seat frame 70 need not be provided with the projection 74. As such, the structure is simple and the cost can also be reduced.

The modified shape described in the first embodiment (see FIGS. 4 to 6) can also be adopted as the shape of the opening-closing part 81, and the support part 84 of the valve body 80.

Figure 16:
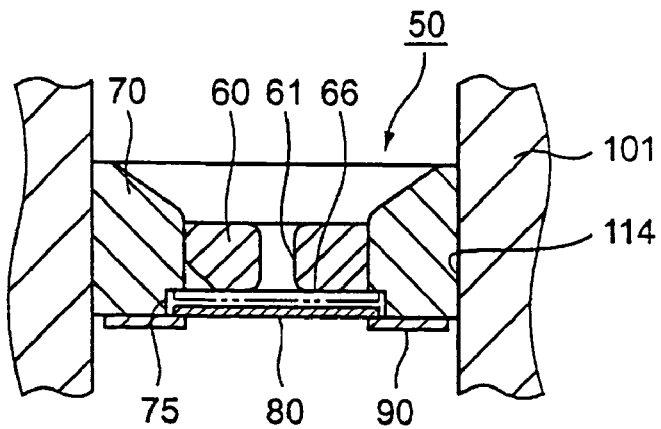
FIG. 16 is a sectional view showing a check valve according to a sixth embodiment of the invention.
Figure 17:
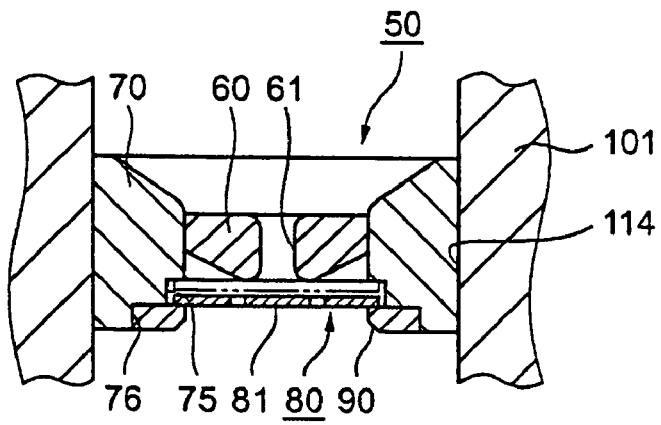
FIG. 17 is a sectional view showing a modification of the check valve according to the sixth embodiment of the invention.

Next, a check valve 50 of a sixth embodiment of the invention will be discussed with reference to FIGS. 16 to 21. FIGS. 16 and 17 show the check valve 50 of the sixth embodiment and a modification thereof, and FIGS. 18 to 21 show valve bodies 80 adopted for the check valve 50.

In FIG. 16, a valve seat frame 70 is formed with a recess part 75 so that a flat portion 66 of the top face of a valve seat 60 and the bottom face become roughly the same face on the side where the working fluid flows out. The recess part 75 has a depth to ensure a stroke in the cross-sectional direction required for the valve body 80 to open and close a communication hole 61 (in the figure, the range in which the valve body 80 moves from the position indicated by the solid line to the position indicated by the chain double-dashed line). A ring-like fixing member 90 is fixedly secured to the lowest face of the valve seat frame 70 in the figure. The inner diameter of a hole made in the fixing member 90 is set smaller than the outer dimension of the valve body 80 and the diameter of the outer periphery is set smaller than the outer dimension of the valve seat frame 70.

The valve body 80 is placed in the space formed by the fixing member 90 and the recess part 75.

The valve body 80 moves in the cross-sectional direction for opening or closing the communication hole 61 following motion of the above-described diaphragm 150 (see FIG. 1).

FIG. 17 shows a modification of the retention structure of the valve body 80. In FIG. 17, the valve seat frame 70 is provided with an additional recess part 76 of a larger diameter than the diameter of the recess part 75 below the recess part 75 in the figure into which the valve body 80 is inserted, and the ring-like fixing member 90 is press-fitted into the recess part 76. The valve body 80 is placed in the space between the fixing member 90 and the valve seat 60. The valve body 80 can move in the cross-sectional direction in the figure as described above (also see FIG. 16).

Figure 18:
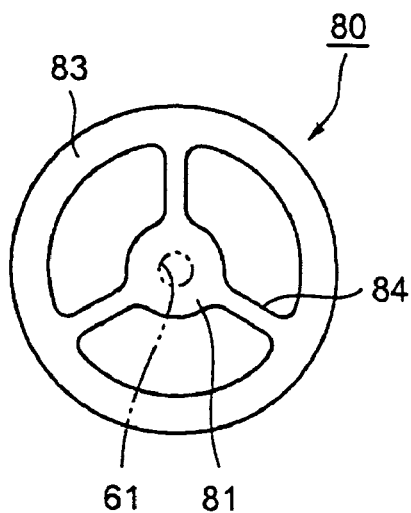
FIG. 18 is a plan view showing a valve body according to the sixth embodiment of the invention.

FIGS. 18 to 21 show valve bodies 80 adopted for the sixth embodiment. In FIG. 18, the valve body 80 is made up of a roughly circular opening-closing part 81 at the center, a ring-like fixing part 83 on the periphery, and three support parts 84 extending radially for joining the opening-closing part 81 and the fixing part 83. The size of the opening-closing part 81 is a size required for hermetically sealing the communication hole 61 and needs to be smaller to allow the working fluid to easily flow out when the opening-closing part 81 is opened. Preferably, each of the support parts 84 is set narrowly in a range in which the strength of the valve body 80 can be ensured.

The opening-closing part 81, the support parts 84, and the fixing part 83 of the valve body 80 are formed in the same plane.

Figure 19:
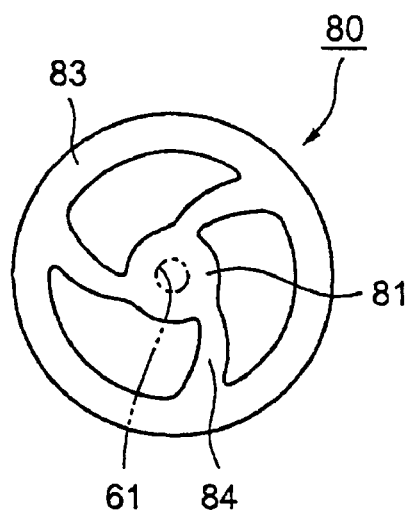
FIG. 19 is a plan view showing another valve body according to the sixth embodiment of the invention.

FIG. 19 shows another modification of the valve body 80. The modification in FIG. 19 differs from the shape of the valve body shown in FIG. 18 only in that support part 84 is formed as radiant circular arcs, like a windmill.

Figure 20:
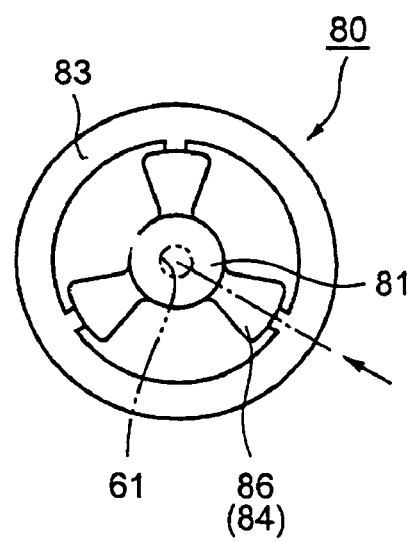
FIG. 20 is a plan view showing another valve body according to the sixth embodiment of the invention.
Figure 21:
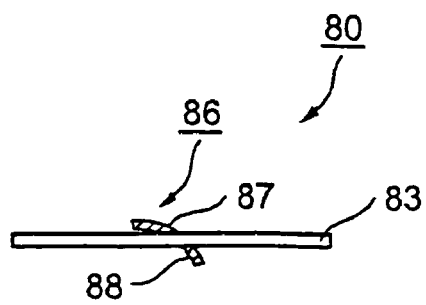
FIG. 21 is a side view showing another valve body according to the sixth embodiment of the invention.

FIG. 20 is a plan view of another modification of the valve body 80 of the sixth embodiment, and FIG. 21 is a side view of the valve body 80 visually recognized from the arrow direction in FIG. 20. In FIG. 20, a support part 84 is implemented as a blade part 86 shaped like a propeller. The blade part 86 joins an opening-closing part 81 and a fixing part 83. The shape of visually recognizing the plane is a fan, and the cross-sectional shape is shown in FIG. 21.

In the valve body 80, the fixing part 83 is regulated at the position in the cross-sectional direction by the recess part 75 of the valve seat frame 70 and the fixing member 90, and the blade part 86 is set in the range in which it does not come in contact with the fixing member 90 or the valve seat 60.

In FIG. 21, the blade part 86 is bent like a bowl in cross section and can be assumed to be a propeller having an astern plane 87 as the plane in the direction of the valve seat 60 and an ahead plane 88 as an opposite side (see FIGS. 16 and 17). Therefore, when pressure is imposed on the ahead plane 88, the valve body 80 is pressed strongly against the valve seat 60, closing the communication hole 61; when pressure is imposed on the astern plane 87, the valve body 80 is pressed in the direction away from the valve seat 60, opening the communication hole 61, and working fluid flows out smoothly along the moderate face of the astern plane 87.

In FIG. 21, the astern plane 87 of the blade part 86 is projected above the top faces of the opening-closing part 81 and the fixing part 83, but the shape can also be set so as not to project from the opening-closing part 81 or the fixing part 83.

Therefore, in the sixth embodiment, the valve body 80 is not fixed and can easily follow the stretch and contraction of the diaphragm 150. When the valve body 80 is opened, the open area where working fluid flows out becomes large, so that the outflow amount can be increased.

The valve body 80 is regulated at the position in the plane direction by the recess part 75 provided in the valve seat frame 70. The range of motion in the cross-sectional direction is also regulated by the fixing member 90. In this manner, the diameter and the depth of the recess part 75 are set appropriately, whereby the move distance of the valve body 80 can be regulated properly.

If the valve body 80 is formed like a propeller (see FIGS. 20 and 21), when the working fluid flows out, the working fluid can flow out from the space between the blades of the blade part 86 in a small resistance state along the astern plane 87 of the moderate curved face of the blade part 86 and when the communication hole is closed by the diaphragm 150 as described above, working fluid presses the ahead plane 88 shaped like a moderate bowl, whereby the communication hole 61 can be closed efficiently, so that the communication hole 61 can be opened and closed efficiently following small motion of the diaphragm.

Although the valve body 80 according to the sixth embodiment can be provided by molding a metal plate by pressing, etc., if injection molding of a synthetic resin, etc., is performed, the shape of the blade part 86 can be molded to a shape more similar to a propeller and the efficiency of advance and backing can be enhanced.

Figure 22:
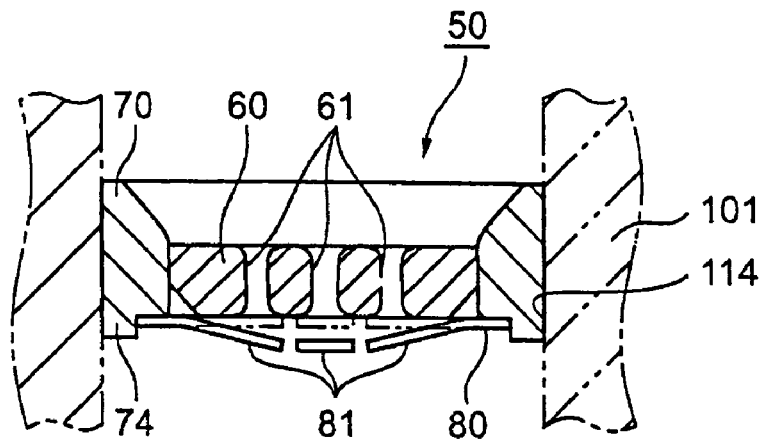
FIG. 22 is a sectional view showing a check valve according to a seventh embodiment of the invention.

Next, a seventh embodiment of the invention will be discussed with FIGS. 22 and 23. FIG. 22 is a sectional view of a check valve 50 of the seventh embodiment, and FIG. 22 is a plan view of a valve body 80 of the seventh embodiment. In FIG. 22, three working fluid communication holes 61 are made in a valve seat 60. Each of the communication holes 61 are formed like a cross-sectional shape similar to that in the embodiment described above. The communication holes 61 are placed so as to form a triangle in plan view. Although the shape of the valve body 80 is described later (with reference to FIG. 23), the valve body 80 is fixed with the positions of the opening-closing parts 81 matched with the positions of the communication holes 61 in a projection 74 provided in a valve seat frame 70. As the fixing structure, any of the fixing structures shown in the first to fifth embodiments described above can also be adopted.

Figure 23:
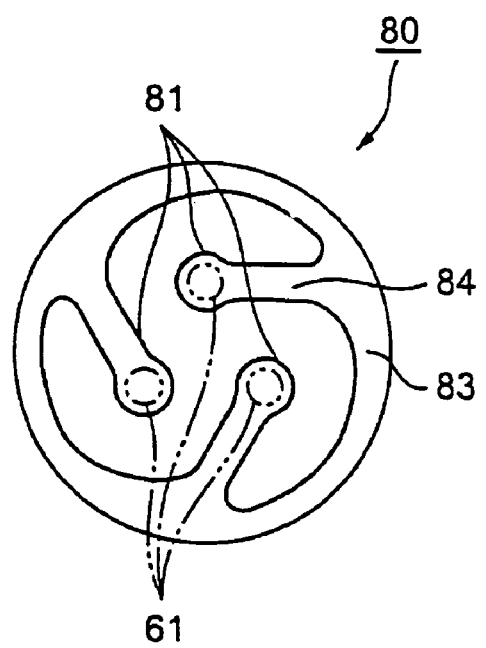
FIG. 23 is a plan view showing a valve body according to the seventh embodiment of the invention.

In FIG. 23, in the valve body 80, support parts 84 are extended from the opening-closing parts 81 provided at the same positions as the communication holes 61 of the valve seat 60, and are made continuous to a fixing part 83. Each of the support parts 84 is set long in a range in which an elastic force required for the opening and closing of the communication hole 61 can be provided, and is also formed to have a shape that prevents torsion, etc., from occurring at the time of bending.

The communication holes 61 are placed as a triangle in plan view in FIG. 23, but may be placed in a line. Further, the number of the communication holes is not limited.

The support part 84 may be extended radially from the center of the valve body 80 and can be appropriately selected and set from the layout of the communication holes 61, the size of the valve body 80, and the elastic force of the support part 84. Therefore, in the seventh embodiment, the valve seat 60 is provided with a plurality of working fluid communication holes 61. Further, the opening-closing parts 81 of the valve body 80 for opening and closing the communication holes 61 are provided in a one-to-one correspondence with the communication holes 61 so that the check valve 50 can be formed without increasing the number of components. If the amplitude of the diaphragm is about 10 µm in a diaphragm type pump, as described in the first embodiment, the operation range of the opening-closing part 81 of the valve body 80 is about 20 µm. Thus, to increase the flow amount of the working fluid, a large number of communication holes 61 can be provided for increasing the flow amount.

Although one opening-closing part 81 can also open and close the plurality of communication holes 61, it is impossible to open and close all the communication holes 61 in a uniform manner because of slight deformation or dimensional variations of the opening-closing part 81. As the separate opening-closing parts 81 are provided in a one-to-one correspondence with the communication holes, all the communication holes 61 can be opened and closed reliably.

Figure 24:
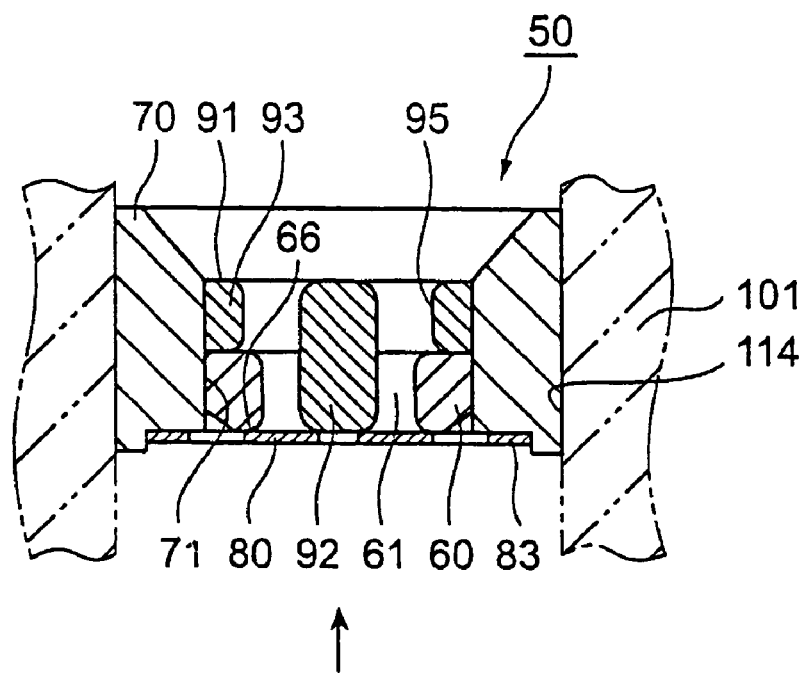
FIG. 24 is a sectional view showing a check valve according to an eighth embodiment of the invention.
Figure 25:
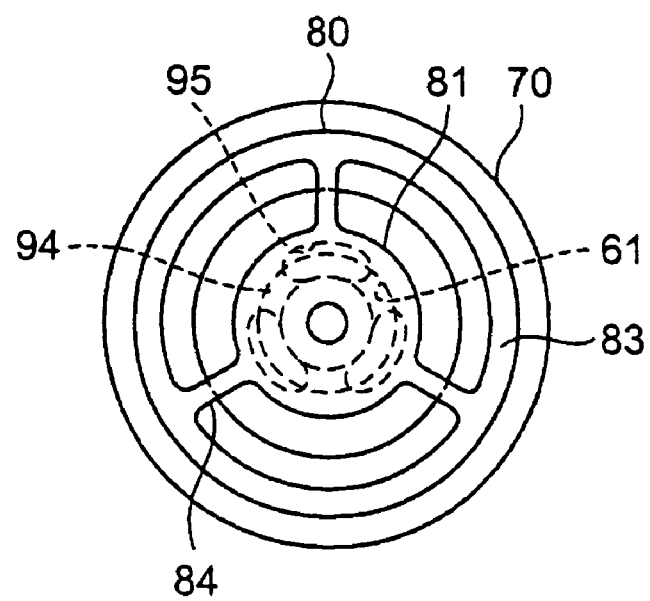
FIG. 25 is a plan view showing the check valve according to the eighth embodiment of the invention.

FIGS. 24 and 25 show a check valve 50 of the eighth embodiment of the invention. FIG. 24 is a sectional view of the check valve 50 of the eighth embodiment, and FIG. 25 is a plan view that visually recognizes a valve body 80 from the arrow direction in FIG. 24. In FIGS. 24 and 25, a valve seat 60 is press-fitted into a through hole 71 made in a valve seat frame 70. A valve seat shaft 91 provided with a projection shaft 92 having a smaller diameter than the through hole 71 of the valve seat 60 is press-fitted into the valve seat frame 70 from the inlet side of working fluid.

The valve seat shaft 91 is formed as a ring-like fixing part 93, and a projection shaft 92 at the center is joined by three support parts 94 (see FIG. 25). The height of the projection shaft 92 is set so as to become the same as a flat portion 66 of the top face of the valve seat 60 when the valve seat shaft 91 is press-fitted into the valve seat frame 70. As the valve seat 60 and the valve seat shaft 91 are combined, the valve seat 60 is formed with a ring-like communication hole 61 of working fluid. The valve body 80 opens and closes the communication hole 61.

In FIG. 25, the valve body 80 is made up of a fixing part 83 on the outer periphery, an opening-closing part 81 at the center, and support parts 84 for joining the opening-closing part and the fixing part, and the opening-closing part 81 has an area covering the ring-like communication hole 61 described above. Preferably, the opening-closing part 81 or the contact area between the valve seat shaft 91 and the opening-closing part 81 is smaller and in a range in which the communication hole 61 can be hermetically sealed reliably. Preferably, the center part of the opening-closing part 81 is punched for preventing extra contact, for example.

To fix the valve body 80 to the valve seat frame 70, any of the structures in the embodiments described above can be adopted.

Although not shown, the area of a communication hole 95 in the valve seat shaft 91 is made larger than the area of the communication hole 61 made in the valve seat 60 to allow a sufficient amount of the working fluid to flow into the communication hole 61. The check valve 50, in one unit, is press-fitted into an inner wall 114 of an opening of a pump chamber 119.

Therefore, in the eighth embodiment, the communication hole 61 is opened like a ring, so that the flow amount of the working fluid can be increased.

For a diaphragm type pump 10 using a piezoelectric element as the actuator as described in the first embodiment (with reference to FIG. 1), the amplitude of the diaphragm is small and thus the fluid resistance can be reduced and the pump efficiency can be enhanced by providing a plurality of small communication holes, or by providing a ring-like communication hole rather than by providing a large communication hole in the valve seat 60.

As the ring-like communication hole, the valve seat 60 can be formed with a ring-like communication hole split like the valve seat shaft 91. In this case, the valve seat shaft 91 becomes unnecessary. However, when a hard material such as cemented carbide or ceramics, etc., is selected for the valve seat 60, if the valve seat shaft 91 shown in the eighth embodiment is used, the ring-like communication hole 61 can be formed easily.

Figure 26:
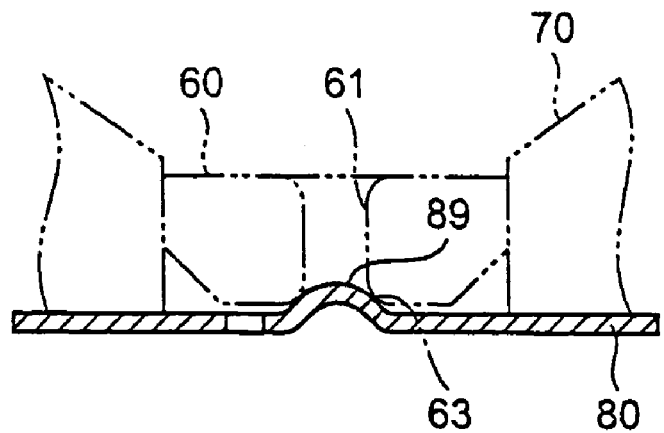
FIG. 26 is a plan view showing a valve body according to a ninth embodiment of the invention.
Figure 27:
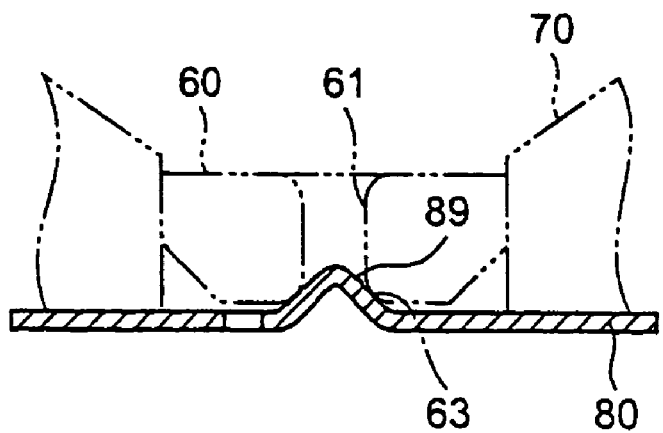
FIG. 27 is a plan view showing another valve body according to the ninth embodiment of the invention.

FIGS. 26 and 27 show valve bodies 80 according to the ninth embodiment of the invention. The ninth embodiment provides modifications of the joint relationship between the opening-closing part 81 of the valve body 80 and the communication hole 61 shown in the first to eighth embodiments. In FIG. 26, an opening-closing part 81 of a valve body 80 is formed with a projection 89 shaped like a dome. The projection 89 comes in contact with an outlet 63 of a communication hole 61 of a valve seat 60 for hermetically sealing the outlet 63.

As shown in FIG. 27, the opening-closing part 81 of the valve body 80 can be provided with a projection 89 shaped roughly like a cone. The dome type or cone type can be selected based on conditions such as the size of the communication hole 61, obtained pressing force, etc.

Therefore, to adopt the valve body shape as in the ninth embodiment, in the valve body 80, if the opening-closing part 81 is shaped like a dome or a cone, contact with the outlet 63 becomes linear contact, contact pressure is increased, and leakage of the working fluid can be prevented. When the opening-closing part 81 is opened, the distance between the valve seat 60 and a support part 84 continuous to the projection 89 of the opening-closing part becomes large as compared with the case where contact is made on a plane, and working fluid can also flow out easily.

In the first to ninth embodiments, the best modes of the fixing structure of the valve seat frame 70 and the valve body 80, the structure of the valve body 80, the structure of the valve seat 60, etc., are shown, but it should be understood that an optimum combination thereof can be selected as desired depending on the size of the pump 10, the target performance, etc.

In the seventh embodiment, the valve body 80 includes the plurality of opening-closing parts 81 in a one-to-one correspondence with the plurality of communication holes 61 of the valve seat 60, but can also include a plurality of valve bodies in a one-to-one correspondence with the communication holes 61.

Further, in the first to ninth embodiments, the valve seat 60, the valve seat frame 70, and the valve body 80 are put into one unit, but the valve seat 60 and the valve body 80 can be directly fixed to the valve seat 60 so that they are put into one unit depending on selection of the size and material of the valve body 80.

Subsequently, a tenth embodiment of the invention will be discussed based on the accompanying drawings. The tenth embodiment is characterized in that a ball is adopted while the valve body of the check valve shown in each of the first to ninth embodiments is formed of a plate member, and is the same as the embodiments described above in the basic configuration, the drive principle, etc., of the pump 10 and therefore the basic configuration, the drive principle, etc., will not be discussed again. Functional members and components of the check valve identical with those previously described in the above embodiments are denoted by the same reference numerals.

Figure 28:
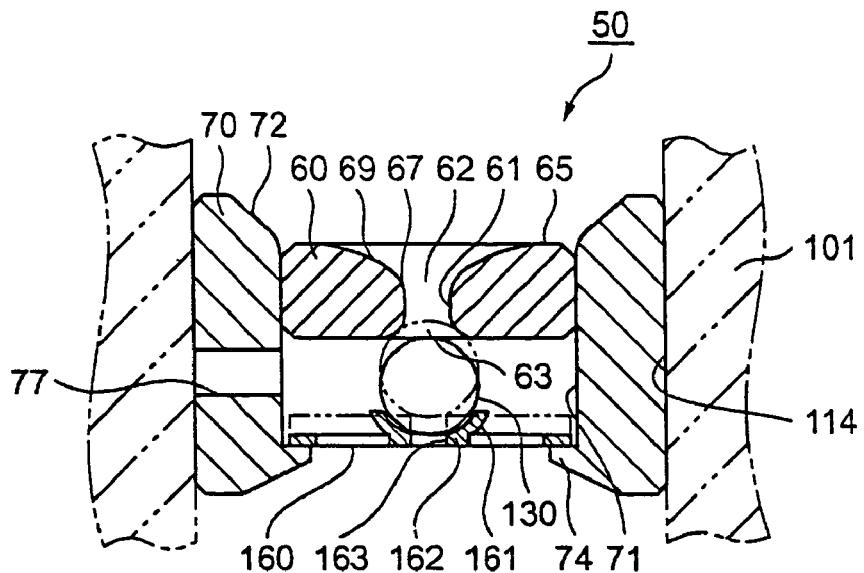
FIG. 28 is a sectional view showing a check valve according to a tenth embodiment of the invention.

FIG. 28 shows the cross-sectional shape of a check valve 50 according to the tenth embodiment. In FIG. 28, the check valve 50 is made up of a valve seat frame 70, a valve seat 60, a ball 130, and a ball support member 160.

The valve seat 60 is a ring-like member having a communication hole 61 for working fluid made at the center, and an inlet 62 and an outlet 63 for the working fluid of the communication hole 61 are rounded smoothly. The inlet side is rounded to decrease the inflow resistance of the working fluid and the outlet side is rounded to decrease a vortex occurring when the working fluid flows out.

The inlet 62 is provided with a slope 69 shaped roughly like a circular arc, and this portion is formed like a funnel for introducing the working fluid smoothly into the communication hole 61.

The outer peripheral surface of the valve seat 60 on the outflow side thereof is chambered for facilitating press-fitting into the valve seat frame 70.

Cemented carbide or ceramics ($Al_2O_3$, etc.,) is adopted as the material of the valve seat 60 as in the first embodiment. The valve seat 60 is press-fitted into a hole 71 of the valve seat frame 70.

The valve seat frame 70 is formed like a ring having the hole 71 made at the center into which the valve seat 60 is press-fitted, and the working fluid inflow side of the hole 71 is formed as a shape rounded smoothly from roughly the same position as the height of a top face 65 in the figure, of the valve seat 60 and continuous to a slope 72 opened wider than the hole 71 in the upper part.

Further, a hole 77 that is pierced from the inside of the valve seat frame 70 to the outside is made at roughly the same position as the ball 130 in the cross-sectional direction of a tubular part of the valve seat frame 70. The hole 77 is set to a size required for inspecting the state of the ball 130 in the check valve 50.

On the opposite side to the slope 72, a tubular projection 74 is formed toward the inside in the inner peripheral part of the hole 71. The ball support member 160 is placed on the projection 74.

Thus, the valve seat frame 70, the valve seat 60, the ball 130, and the ball support member 160 are put into a unit and are press-fitted into an inner wall 114 of a pump chamber body 101.

The ball support member 160, which is described later (with reference to FIG. 28), is formed with three claw parts 161 at the center. The ball 130 is included in the claw parts 161. The ball 130 is spherical, has a gap in which it can move between the outlet 63 of the valve seat 60 and the claw parts 161, hermetically seals the outlet 63 for blocking outflow of working fluid (indicated by the chain double-dashed line in the figure), and opens the outlet 63 for allowing the working fluid to flow (indicated by the solid line).

Figure 29:
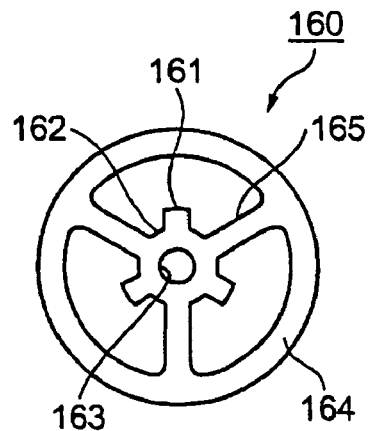
FIG. 29 is a plan view showing a ball support member of the check valve according to the tenth embodiment of the invention.

FIG. 29 is a plan view of the ball support member 160 of the tenth embodiment. In FIG. 29, the ball support member 160 is formed like a ring whose outer periphery is a little smaller than the hole 71 of the valve seat 70 described above, and is larger than the inner diameter of the projection 74 (see also FIG. 28). A ball support part 162 shaped roughly like a ring is provided at the center of the ball support member 160, a communication hole 163 of working fluid is made in the center of the ball support part 162, and the ball support part 162 And an outer periphery support part 164 on the outer periphery are joined by three support parts 165. From the ball support part 162, the claw parts 161 are projected radially each between the contiguous support parts 165 and are bent up upward in the cross section (see FIG. 28). The claw parts 161 are bent up to such a shape supporting the hemisphere of the ball 130 and the ball 130 does not largely move in the plane direction.

Preferably, the claw part 161 has dimensions to the range below the center of the ball 130 as shown in FIG. 28 to decrease the outflow resistance of the working fluid.

Therefore, in FIGS. 28 and 29, when the communication hole 61 is hermetically sealed, the ball 130 is pushed up by the working fluid made to flow from the communication hole 163 of the ball support member 160 and the opening between the support parts 165 and presses the outlet 63 of the valve seat 60 (indicated by the chain double-dashed line in FIG. 28). The ball support member 160 is also pushed up by the working fluid and presses the ball 130 against the outlet 63. When the communication hole 61 is opened, the ball support member 160 moves to a position where movement is regulated by the projection 74 of the valve seat frame 70 and the ball 130 also moves to the positions of the claw parts 161, which opens the communication hole 61 that allows the working fluid to flow out from the opening between the support parts 165 and the communication hole 163.

Next, a modification of the ball support member 160 of the tenth embodiment will be discussed with FIG. 30 (also see FIGS. 28 and 29).

Figure 30:
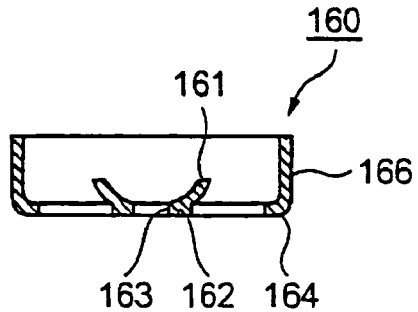
FIG. 30 is a sectional view showing a modification of the ball support member of the check valve according to the tenth embodiment of the invention.

FIG. 30 shows, in cross section, the ball support member 160. In FIG. 30, the ball support member 160 is formed with a tubular side guide part 166 that is projected toward the valve seat 60 on the periphery of the outer periphery support part 164.

The diameter of the outer periphery of the side guide part 166 is set a little smaller than the diameter of the inner periphery of the hole 71 of the valve seat frame 70 and can move in the direction of the valve seat 60 along the wall of the hole 71. The shape of the claw parts 161, etc., other than the side guide part 166 is formed as the same shape as the ball support member 160 shown in FIG. 29.

Figure 31:
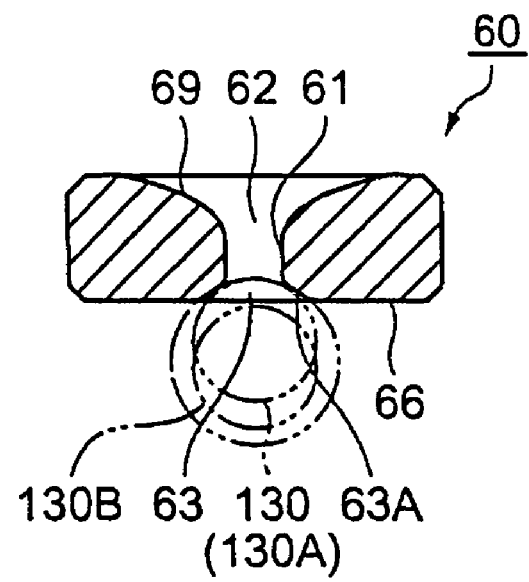
FIG. 31 is a sectional view showing a valve seat of the check valve according to the tenth embodiment of the invention.

Although the material of the ball support member 160 is not limited, stainless steel can be adopted considering the structural strength and corrosion resistance and an aluminum alloy, a synthetic resin, etc., can be adopted taking weight reduction into consideration. To adopt an aluminum alloy, preferably the surface is subjected to oxidation resistance treatment such as anodizing, etc. To adopt a synthetic resin, etc., injection molding can be conducted and thus the positional relationship between the claw parts 161 and the support parts 165 can be selected as desired. FIG. 31 shows the cross section of the valve seat 60 of the tenth embodiment. In FIG. 31, the valve seat 60 has the working fluid communication hole 61 made at the center, and as described above, the inlet 62 and the outlet 63 of the communication hole 61 are rounded smoothly and the inlet 62 is provided with the slope 69 continuous as a circular arc like a funnel so that working fluid is easily introduced into the communication hole 61. The outlet 63 is formed with a dent 63A having a circular arc of a larger diameter than the diameter of the ball 130 and a smoothly continuous shape is formed from the communication hole 61 to the dent 63A.

In FIG. 31, when the ball 130 moves from a position where the communication hole 61 is hermetically closed (130A) to a position 130B where the communication hole 61 is opened, the average distance from the dent 63A of the valve seat 60 to the ball 130 becomes large if the movement distance of the ball 130 in the vertical direction is the same, as compared to a case where the dent 63A does not exist (not shown). This means that as the flow cross-sectional area of the working fluid increases, the fluid resistance decreases.

Figure 32:
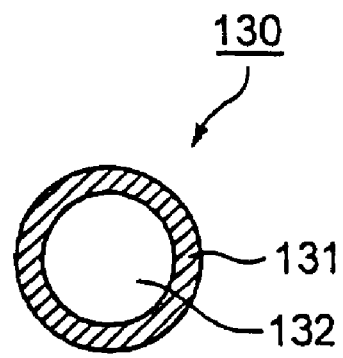
FIG. 32 is a sectional view showing a ball of the check valve according to the tenth embodiment of the invention.

Subsequently, the ball 130 according to the tenth embodiment will be discussed with FIG. 32. FIG. 32 is a sectional view of the ball 130 of the tenth embodiment for opening and closing the valve seat 60. In FIG. 32, the ball 130 is spherical and is made up of an outer shell 131 and a hollow part 132. A metal material such as an iron-based alloy, a stainless alloy, a copper-based alloy, or an aluminum alloy or a non-metallic material such as glass, ceramics, or a synthetic resin can be adopted for the ball 130. The center part is hollow to lessen the average value of a density of the ball 130. Accordingly, in the working fluid, the weight per unit volume of the ball 130 is roughly the same as the weight per unit volume of the working fluid pushed away by the ball 130.

Assuming that the working fluid is water having a specific gravity of 1 and the material of the ball 130 is an iron-based alloy having a specific gravity of 7.9, the thickness of the outer shell 131 becomes about 4.5% of the radius of the ball 130. The thickness of the outer shell 131 is calculated by the specific gravities of the working fluid and the ball material. Therefore, if the material of the ball 130 is glass having a specific gravity of 4, the thickness of the outer shell 131 may be made about 8.9% of the radius of the ball.

If a synthetic resin, etc., having a specific gravity of 1 is adopted, the ball 130 does not require the hollow part 132. Further, if the working fluid has a large specific gravity or the drive capability (pressure) of the pump described above is sufficiently large, the hollow part is not required either.

Therefore, in the tenth embodiment, the check valve 50 is made up of the four parts of the valve seat 60, the valve seat frame 70, the ball 130, and the ball support member 160. Thus, the number of components is small, and each component has a simple shape so that the check valve 50 can be manufactured easily, shape management is also easy to conduct, and the check valve 50 can be manufactured at low cost. Since the check valve 50 is put into a unit, performance management can be conducted in a single unit as the check valve 50 and when the check valve 50 is built in the pump 10, stable performance of the check valve 50 can be provided without again adjusting or inspecting the check valve 50. Consequently, a pump having stable performance can be provided. The check valve 50 can be built in the pump 10 without touching the ball 130 or the communication hole 61 of the valve seat 60 so that predetermined performance can be provided without causing damage to or deforming the check valve 50 during assembly.

Since the valve seat 60 is opened and closed by the ball 130, when the valve seat 60 is open, working fluid flows on the surface of the ball and thus the flow resistance is small. When the valve seat 60 is hermetically sealed, the valve seat 60 and the ball 130 come in line contact with each other, the contract pressure increases, and the valve seat 60 can be hermetically sealed reliably.

Since the ball support member 160 supporting the ball 130 has the shape as shown in FIGS. 29 and 30, it can be easily formed of a metal plate material by working means of pressing, etc., for example. The center of the ball 130 from the communication hole 163 of the ball support member 160 and, further, the peripheral part from the opening between the support parts 165 are pushed up by working fluid and the ball 130 presses the valve seat 60 for hermetically sealing the communication hole 61. Thus, the ball 130 easily moves as the pressure of the working fluid changes, and the communication hole 61 of the valve seat 60 can be hermetically sealed reliably.

Further, the ball 130 is supported by the three projected claw parts 161 provided in the ball support member 160, and the claw parts 161 support the ball 130 in the range smaller than the diameter of the ball 130 so that the claw parts can support the ball 130 in a state in which the flow of the working fluid is less hindered and can support the ball 130 more reliably.

The ball 130 and the ball support member 160, and the ball support member 160 and the valve seat frame 70, are supported, but not fixed. Therefore, as only the ball 130 moves, the communication hole 61 of the valve seat 60 can be opened and closed; the ball 130 can be pushed up by the ball support member 160 for hermetically sealing the communication hole 61; and the ball 130 and the ball support member 160 can move together for opening the communication hole 61. Because of the structure wherein not only the ball 130, but also the ball support member 160 can move, the ball support member 160 can receive positive pressure of the pump chamber and press the ball 130, for example, so that the hermetic sealing force of the communication hole 61 can be enhanced.

In the ball support member 160 shown in FIG. 30, the tubular side guide part 166 is provided on the periphery of the outer periphery support part 164, so that the ball support member 160 moves along the inner wall of the hole 71 and thus is not inclined and can move smoothly for opening and closing the communication hole 61 reliably as compared with the case where the side guide part 166 does not exist. Although the side guide part 166 is provided, it is not necessary to increase the space of the check valve 50.

Since the average value of the density of the ball 130 and the density of working fluid are made roughly the same, the ball 130 is in a floating state or a state close to the floating state in the working fluid, for example, if driving of the pump 10 is stopped. Thus, if the pump 10 is driven, the ball 130 moves due to a slight pressure change of the working fluid, so that if an actuator 301 of the pump 10 is driven at a high frequency like a piezoelectric element, the ball moves in synchronization with the driving and can open and close the valve seat 60.

In the tenth embodiment, the ball 130 is hollow and thus the average value of the density can be decreased and the thickness of the outer shell 131 of the ball 130 is adjusted according to the material of the ball 130 and the material of the working fluid, whereby the weight per unit volume of the ball 130 can be set to roughly the same as the weight per unit volume of the working fluid pushed away by the ball 130 as described above. Thus, the ball can moves due to slight pressure change of the working fluid as described above, so that as with the pump 10 of the embodiment, the ball easily moves in synchronization with driving the actuator and can open and close the valve seat 60 at high speed and reliably.

Further, the communication hole 61 of the valve seat 60 has the inlet 62 and the outlet 63 where the working fluid flows are formed smoothly and continuously as roughly circular arcs c, and the outlet 63 is formed on the outside of the opening with the dent 63A having a circular arc of a larger diameter than the diameter of the ball 130 so that the flow resistance when the working fluid flows through the valve seat 60 can be decreased. Particularly, the outlet 63 is opened and closed by the ball 130 and thus when the outlet 63 is formed on the outside of the opening with the dent 63A having a circular arc larger than the diameter of the ball, even when the ball 130 is brought slightly away from the valve seat 60, the cross-sectional area of the opening where the working fluid flows out can be provided widely, so that the outflow amount of the working fluid can be increased. This also provides the effect of promoting a bringing of the ball 130 away from the valve seat 60.

The ball 130 moves to the outlet 63 along the dent 63A and hermetically seals the communication hole 61. Thus, if the ball 130 moves with the plane direction position of the ball 130 varying slightly, the ball is guided into the surface of the dent 63A and can hermetically seal the communication hole 61 more reliably.

Subsequently, an eleventh embodiment according to the invention will be discussed based on the accompanying drawing. The eleventh embodiment is characterized in that it differs from the tenth embodiment in the form of a ball. Functional parts identical with those previously described in the tenth embodiment are denoted by the same reference numerals in the description to follow.

Figure 33:
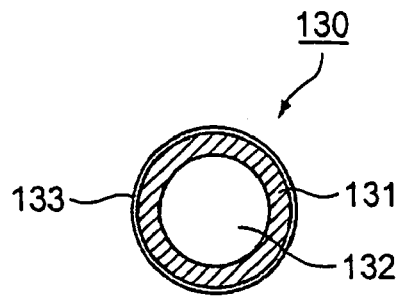
FIG. 33 is a sectional view showing a ball of a check valve according to an eleventh embodiment of the invention.

FIG. 33 shows a cross section of a ball 130 according to a eleventh embodiment of the invention. The ball 130 shows another embodiment of the ball 130 placed in the check valve 50 described (with reference to FIG. 28) in the tenth embodiment. In FIG. 33, the ball 130 is a sphere provided with a hollow part 132, and an outer shell 131 is formed on the surface with a coating 133. As the coating, a hard anodic oxide coating of cemented carbide, a metal such as nickel or chromium, and ceramics, etc., can be adopted. As means for coating, a wet plating such as an electroplated coating or a chemical plating or a dry plating such as vacuum evaporation, sputtering, or ion plating can be adopted. The means chosen for plating can be selected in conformance with the material of the ball 130.

A rubber-based soft material can also be adopted as the coating.

Preferably, the average value of the density of the ball 130 and the mass of working fluid are made roughly the same, as described above and therefore the thickness of the coating 133 is set conforming to the material of the ball 130 and the thickness of the outer shell 131; preferably the thickness of the coating is set to 5 μm or more to ensure the structural strength.

The coating 133 can be formed of one layer or can be formed of multiple layers using a plurality of different materials in combination. For example, a soft coating can also be put on the upper layer of a hard anodic oxide coating.

Therefore, in the eleventh embodiment, the ball 130 for opening and closing a communication hole 61 is formed on the outer shell surface with the coating 133. Thus, even if the material of the ball 130 is limited from standpoint of ease of manufacturing, if a hard anodic oxide coating is selected, the hardness of the surface is high and thus the ball is less worn or is less damaged by the shock of opening and closing the communication hole 61 even if the ball is used for a long term.

If the ball 130 is made hollow as described above, the coating can prevent the ball 130 from becoming deformed.

Further, if a rubber-based soft coating is selected, the sealing property of the valve seat 50 can be enhanced.

Subsequently, a twelfth embodiment of the invention will be discussed with FIGS. 34 and 35. The twelfth embodiment differs from the tenth embodiment (see FIG. 28) in the ball support structure of check valve 50 and therefore this difference will be discussed in detail. Functional members and parts identical with those in the tenth embodiment are denoted by the same reference numerals in the description to follow.

Figure 34:
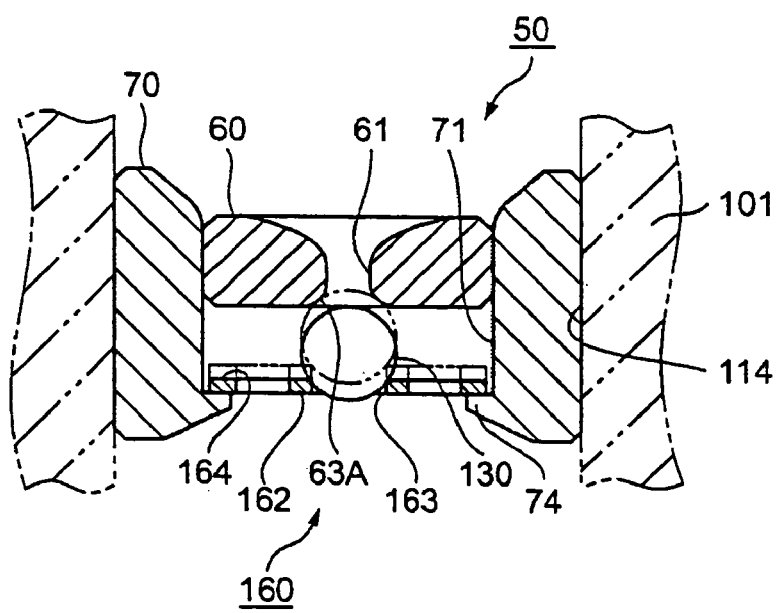
FIG. 34 is a sectional view showing a check valve according to a twelfth embodiment of the invention.

FIG. 34 is a sectional view showing a check valve 50 according to the twelfth embodiment. In FIG. 34, a valve seat 60 is press-fitted into a hole 71 of a valve seat frame 70, a ball support member 160 is placed in a projection 74 provided on the valve seat frame 70, and a ball 130 is provided between the valve seat 60 and the ball support member 160. That is, they are put into a unit. The check valve 50 is press-fitted into an inner wall 114 of an opening of a pump chamber body 101.

Figure 35:
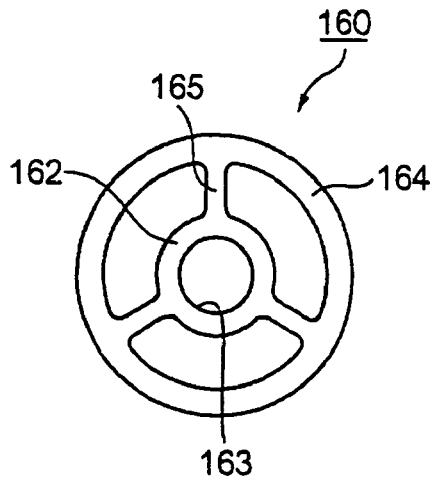
FIG. 35 is a plan view showing a ball support member of the check valve according to the twelfth embodiment of the invention.

FIG. 35 is a plan view of the ball support member 160 according to the twelfth embodiment. In FIG. 35, the ball support member 160 is made up of an outer periphery support part 164, a ball support part 162 for supporting the ball 130, and three support parts 165 for joining the outer periphery support part 164 and the ball support part 162. A communication hole 163 where the working fluid flows is made in the center of the ball support part 162. The ball 130 moves between the ball support part 162 and the valve seat 60 and opens and closes a working fluid communication hole 61 of the valve seat 60.

In FIG. 34, to open the valve seat 60, the ball 130 is regulated at a position in the plane direction with a part of the ball inserted into the communication hole 163 of the ball support member 160. The ball support member 160 exists at the position abutting the projection 74 of the valve seat frame 70. This state is indicated by the solid line in the figure. When the ball 130 hermetically seals the communication hole 61, the ball 130 presses an outlet 63 of the valve seat 60. The ball 130 and the ball support member 160 at the time are indicated by the chain double-dashed line in the figure.

The distance between the ball support member 160 and the valve seat 60 is set to a distance in engagement with the communication hole 163 regardless of the state in which the ball 130 opens or closes the valve seat 60, so that the ball 130 does not deviate from between the communication hole 163 and the outlet 63.

Therefore, the check valve 50 in the twelfth embodiment does not include the claw parts 161 of the ball support member 160 (described with reference to FIGS. 29 and 30) in the tenth embodiment and thus can be formed easily of a metal plate material by working means of pressing, etc. Since no claw parts 161 are included, the communication hole 163 made in the ball support member 160 can be made large and the area of the ball 130 pushed up by working fluid becomes wide, so that the ball 130 easily moves and the communication hole 61 of the valve seat can be hermetically sealed reliably.

Figure 36:
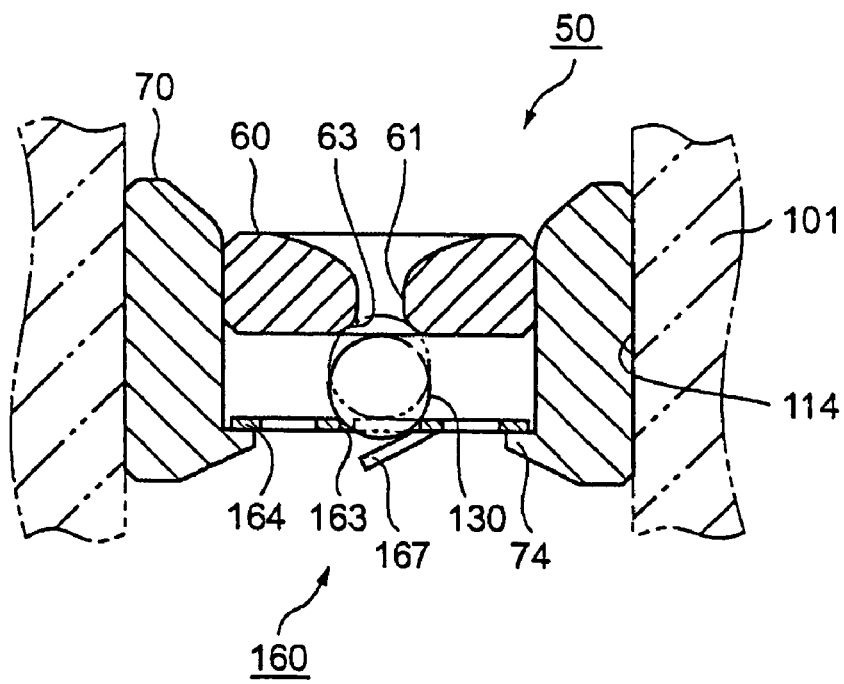
FIG. 36 is a sectional view showing a check valve according to a thirteenth embodiment of the invention.
Figure 37:
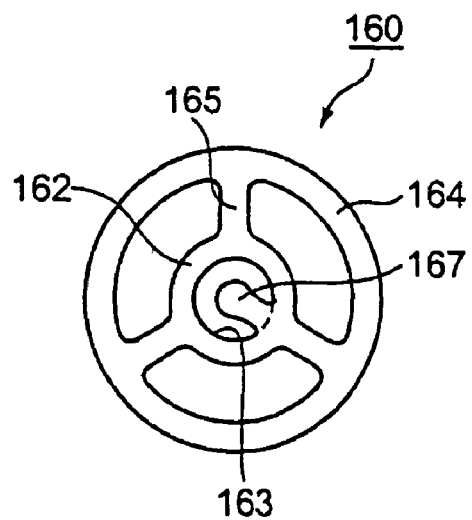
FIG. 37 is a plan view showing a ball support member of the check valve according to the thirteenth embodiment of the invention.

When the ball 130 is brought away from the valve seat 60 and the valve seat 60 is opened, the ball 130 is regulated at the position and is supported in a state in which it is inserted into the communication hole 163, so that the ball can be supported at the appropriate position with a small space and moreover in a simple shape. FIGS. 36 and 37 are a sectional view of a check valve 50 of the thirteenth embodiment and a plan view of a ball support member 160 respectively. The thirteenth embodiment differs from the twelfth embodiment only in that the ball support member 160 is provided with an elastic part 167 for pressing a ball 130 and therefore only this difference will be discussed. In FIGS. 36 and 37, the ball support member 160 is formed with the elastic part 167 projecting like a tongue in a communication hole 163 at the center. Other shapes are the same as those of the ball support member 160 in the twelfth embodiment (with reference to FIG. 35).

In FIG. 36, the ball 130 is pressed against an outlet 63 of the valve seat 60 by the elastic force of the elastic part 167 of the ball support member 160 and hermetically seals the valve seat 60 (indicated by the chain double-dashed line in the figure). At the time, the ball pressing force of the elastic part 167 may be a force to such an extent that the ball 130 comes in contact with the outlet 63, and the most of the valve seat pressing force of the ball 130 is the pressing force of working fluid. At the time, it is considered that the ball support member 160 is also pushed up by the working fluid. That is, the ball support member 160 moves to the position where the ball 130 and a corner of the inner wall of the communication hole 163 come in contact with each other. At this time, the elastic part 167 is bent in the outside direction of the check valve 50.

The ball 130 presses down the elastic part 167 and is brought away from the valve seat 60 for opening the outlet 63. When the outlet 63 is opened, the elastic force of the elastic part 167 is set to a size to such an extent that the ball can be opened by negative pressure in the pump chamber 119.

Therefore, according to the thirteenth embodiment, the ball 130 opens and closes the outlet 63 of the valve seat 60, and the ball support member 160 is provided with the elastic part 167. Thus, the ball 130 can be pressed against the outlet 63 by the pressing force provided by adding the elastic force and the working fluid pressure for hermetically sealing the outlet 63 reliably. If the ball 130 is brought into contact with the outlet 63 of the valve seat 60 at all times by the elastic part 167, when a pump 10 is stopped, working fluid can be prevented from flowing out.

Figure 38:
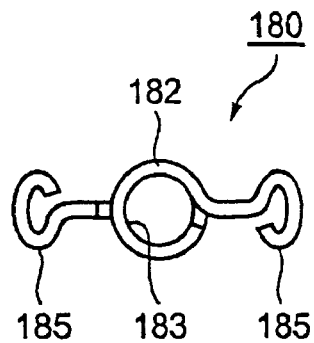
FIG. 38 is a plan view showing a ball support member of a check valve according to a fourteenth embodiment of the invention.
Figure 39:
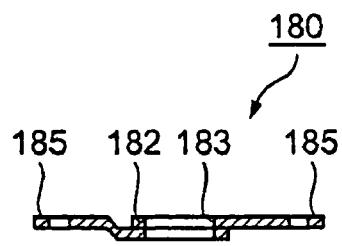
FIG. 39 is a sectional view showing the ball support member of the check valve according to the fourteenth embodiment of the invention.

FIGS. 38 and 39 are a plan view and a sectional view showing a ball support member 180 of the fourteenth embodiment according to the invention. The fourteenth embodiment is characterized in that the ball support member is formed of a wire while the ball support member 160 in each of the tenth to thirteenth embodiments is a plate-like member. In FIGS. 38 and 39, the ball support member 180 is formed of a wire that is circular or rectangular in cross section, has a ball support part 182 wound at the center, and is formed at both ends with support parts 185 extended and wound symmetrically with respect to a point with the ball support part 182 as the center. The support parts 185 and the top face of the ball support part 182 are at the same height. The center formed by ball support part 182 is a communication hole 183 of working fluid and has roughly the same size as the communication hole 163 of the ball support member 160 described (with reference to FIG. 35) in the twelfth embodiment.

The ball support member 180 thus formed is placed in a valve seat frame 70 like the ball support member 160 shown (with reference to FIG. 34) in the twelfth embodiment, although not shown here. This means that the ball support member is placed with the support parts 185 at both ends engaged in and supported on a projection 74 of the valve seat frame 70.

A material with large structural strength such as stainless steel or a piano wire is adopted for the ball support member 180 of the embodiment. If SPRON material (SPRON is a trademark of Seiko Instrument Kabushikikaisha. The main component is an alloy of Co, Ni, and Cr) used with a hair spring of a clock, etc., generally called a constant modulus material is adopted, the ball support member 180 using a finer wire can be provided.

Therefore, according to the fourteenth embodiment, similar advantages to those of the twelfth embodiment described above can be provided and in addition, since the ball support member 180 is formed of a fine wire, the fluid resistance of working fluid can be substantially decreased particularly when the working fluid flows out from a valve seat 60. If the ball support member 180 is formed of a wire circular in cross section, the fluid resistance can be still more decreased.

The ball support member 180 can be easily manufactured by means of wire forming, etc., and large facilities are not required. Thus, the ball support member 180 is also effective for cost reduction.

Figure 40:
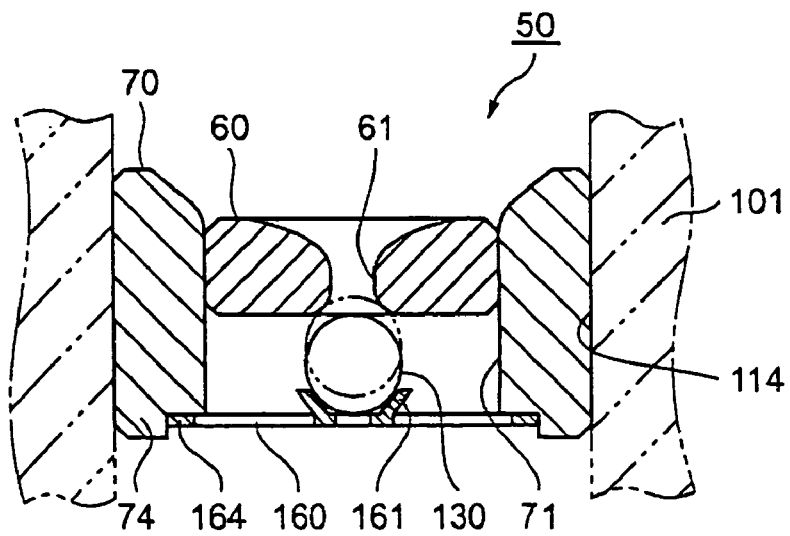
FIG. 40 is a sectional view showing a check valve according to a fifteenth embodiment of the invention.

FIG. 40 is a sectional view showing a check valve of the fifteenth embodiment. The fifteenth embodiment is characterized in that a ball support member 160 is fixedly secured to a valve seat frame 70. In FIG. 40, the ball support member 160 has the same shape as the ball support member 160 (shown in FIG. 29) in the tenth embodiment, and the outer diameter of an outer periphery support part 164 is formed larger than the inner diameter of a valve seat placement hole 71 of a valve seat frame 70.

A ring-like projection 74 for regulating the position of the ball support member 160 is provided at the working fluid outflow end of the valve seat frame 70, the ball support member 160 is placed inside the projection 74, and the valve seat frame 70 and the ball support member 160 are fixedly secured by securing means of welding, adhesion, etc.

Therefore, according to the fifteenth embodiment, the ball 130 opens and closes a communication hole 61 solely, but the ball support member 160 is fixedly secured to the valve seat frame 70, and the ball 130 is regulated at a position in the plane direction by claw parts 161 of the ball support member 160, so that the position of the ball relative to the communication hole of the valve seat can be regulated more precisely.

Because of the structure wherein only the ball 130 moves, a check valve of a simple structure can be provided as compared to the structure wherein the ball support member 160 moves.

The invention is not limited to the embodiments described above and modifications, improvements, etc., in the range in which the object of the invention can be accomplished are contained in the invention.

For example, in the tenth to thirteenth embodiments described above, the check valve 50 as a unit of the valve seat 60, the valve seat frame 70, the ball 130, and the ball support member 160 is built in the pump chamber body 101, but the valve seat 60, the ball 130, and the ball support member 160 can be directly built in without using the valve seat frame 70.

Figure 41:
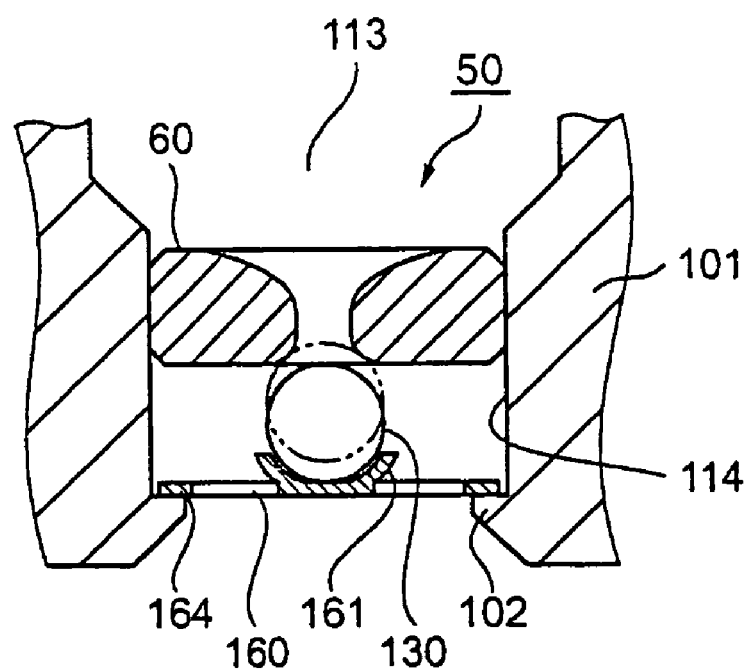
FIG. 41 is a sectional view showing a check valve according to another embodiment of the invention.

FIG. 41 is a sectional view of a check valve 50 using no valve seat frame 70. A pump chamber body 101 is formed with a hole communicating with a pump chamber 119 from an opening 113 (also see FIG. 1), a projection 102 shaped like a ring is formed on the inside of an inner wall 114 of the hole, and the outer periphery support part 164 of the ball support member 160 previously described with FIG. 29 or 30 is supported on the projection 102. A ball 130 is placed inside claw parts 161 of the ball support member 160, and a valve seat 60 is press-fitted into an inner wall 114 of the pump chamber 101 to form the check valve 50.

In such a structure, the advantage of putting the check value 50 into one unit as in the embodiment described above cannot be provided, but a similar advantage to that of the embodiment described above can be provided for opening and closing the valve seat 60. The structure can also be made simpler.

The ball support member 160 shown (with reference to FIG. 35) in the twelfth embodiment or the ball support member 160 shown (with reference to FIG. 37) in the thirteenth embodiment can be adopted for the structure of fixedly securing the ball support member 160 and the valve seat frame 70 (with reference to FIG. 40) as in the fifteenth embodiment.

Further, in the tenth to thirteenth embodiments described above, the ball 130 and the ball support member 160 are separated, but the ball 130 and the ball support member 160 shown in the twelfth embodiment can also be fixed in one piece by means of adhesion, etc., so that the ball 130 and the ball support member 160 move together for opening and closing the valve seat 60, for example.

In the eleventh embodiment described above, the ball 130 is a hollow sphere, but a porous material such as a styrol-based porous synthetic resin or porous ceramics can also be adopted. To adopt a porous material, a watertight coating is formed on the surface.

To use such a porous material, the weight of the ball 130 can be reduced and the ball 130 need not necessarily be made hollow.

What is claimed is:

1. A check valve for regulating flow within a passage defined in a chamber body comprising:
   a tubular valve seat frame including a through-hole, the tubular valve seat frame coupled to the chamber body so that the through-hole is in fluid communication with the passage;
   a valve seat received in the through-hole, the valve seat fixedly secured to an inside of said valve seat frame, said valve seat having a communication hole through which a working fluid flows; and
   a valve body having a fixing part that is coupled to the valve seat frame to be disposed on a working fluid outflow side of said valve seat, wherein said valve seat frame, said valve seat, and said valve body are formed into one unit to be coupled as the one unit to the chamber body;
   said valve body further including an opening-closing part that selectively opens and closes the communication hole, wherein the fixing part and the opening-closing part are partially separated by a slit, the opening-closing part being wider than the communication hole so that the opening-closing part selectively seats against an entire periphery of the communication hole, the fixing part of the valve body being continuous to completely surround the opening-closing part, and the fixing part overlapping both the valve seat frame and the valve seat.

2. The check valve as claimed in claim 1, wherein
   said valve seat is formed of a material having hardness greater than that of said valve seat frame and that of said valve body.

3. The check valve of claim 1, wherein the fixing part of the valve body substantially encompasses the communication hole.

4. A check valve for regulating flow within a passage defined in a chamber body comprising:
   a tubular valve seat frame including a through-hole, the tubular valve seat frame coupled to the chamber body so that the through-hole is in fluid communication with the passage, the valve seat frame including an end face;
   a valve seat received in the through-hole, the valve seat fixedly secured to an inside of said valve seat frame, said valve seat having a communication hole through which a working fluid flows; and
   a valve body having a fixing part that is coupled to the end face of the valve seat frame to be disposed on a working fluid outflow side of said valve seat for opening and closing said valve seat, wherein:
   said valve seat frame, said valve seat, and said valve body are formed into one unit to be coupled as the one unit to the chamber body;
   a working fluid outflow side end face of said valve seat and an end face of said valve seat frame are substantially flush; and
   said valve body further including an opening-closing part that selectively opens and closes the communication hole, wherein the fixing part and the opening-closing part are partially separated by a slit, the opening-closing part being wider than the communication hole so that the opening-closing part selectively seats against an entire periphery of the communication hole, the fixing part of the valve body being continuous to completely surround the opening-closing part, and the fixing part overlapping both the valve seat frame and the valve seat.

5. A check valve for regulating flow within a passage defined in a chamber body comprising:

a tubular valve seat frame including a through-hole, the tubular valve seat frame coupled to the chamber body so that the through-hole is in fluid communication with the passage;

a valve seat received in the through-hole, the valve seat fixedly secured to an inside of said valve seat frame, said valve seat having a communication hole through which a working fluid flows; and a valve body having a fixing part that is coupled to the valve seat frame to be disposed on a working fluid outflow side of said valve seat for opening and closing said valve seat, wherein:

said valve body further includes an opening-closing part that selectively opens and closes the communication hole, wherein the fixing part and the opening-closing part are partially separated by a slit, the opening-closing part being wider than the communication hole so that the opening-closing part selectively seats against an entire periphery of the communication hole, the fixing part of the valve body being continuous to completely surround the opening-closing part, and the fixing part overlapping both the valve seat frame and the valve seat;

said valve seat frame, said valve seat, and said valve body are formed into one unit to be coupled as the one unit to the chamber body; and an inlet and an outlet end of said valve seat adjacent said communication hole are smoothly rounded to decrease a fluid resistance of the working fluid.

* * * * *